(12) United States Patent
Yamamoto et al.

(10) Patent No.: US 10,864,937 B2
(45) Date of Patent: Dec. 15, 2020

(54) ELECTRIC POWER STEERING APPARATUS

(71) Applicant: Mitsubishi Electric Corporation, Tokyo (JP)

(72) Inventors: Munenori Yamamoto, Tokyo (JP); Akihiko Mori, Tokyo (JP); Jun Suzumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/345,775

(22) PCT Filed: Mar. 30, 2017

(86) PCT No.: PCT/JP2017/013157
§ 371 (c)(1),
(2) Date: Apr. 29, 2019

(87) PCT Pub. No.: WO2018/179197
PCT Pub. Date: Oct. 4, 2018

(65) Prior Publication Data
US 2020/0055542 A1     Feb. 20, 2020

(51) Int. Cl.
*B62D 5/04*     (2006.01)
*H02P 27/08*    (2006.01)

(52) U.S. Cl.
CPC ......... *B62D 5/0463* (2013.01); *B62D 5/0493* (2013.01); *H02P 27/08* (2013.01)

(58) Field of Classification Search
CPC ............................ B62D 5/0463; H02P 29/028
USPC ............................... 318/400.21, 400.01, 700
See application file for complete search history.

(56) References Cited

U.S. PATENT DOCUMENTS

| | | | |
|---|---|---|---|
| 7,207,412 B2* | 4/2007 | Uryu | B62D 5/0481 180/443 |
| 7,948,205 B2* | 5/2011 | Gunji | H02P 29/0241 318/800 |
| 9,124,207 B2* | 9/2015 | Hayashi | H02P 6/20 |
| 10,625,772 B2* | 4/2020 | Sasaki | B62D 6/00 |
| 2013/0200827 A1 | 8/2013 | Kezobo et al. | |
| 2013/0234635 A1 | 9/2013 | Kojima | |
| 2013/0285591 A1 | 10/2013 | Suzuki | |
| 2016/0212295 A1 | 7/2016 | Murata et al. | |

(Continued)

FOREIGN PATENT DOCUMENTS

| | | |
|---|---|---|
| JP | 2013-162680 A | 8/2013 |
| JP | 2015177620 A | 10/2015 |

(Continued)

OTHER PUBLICATIONS

International Search Report of PCT/JP2017/013157 dated Jun. 27, 2017.

(Continued)

*Primary Examiner* — David Luo
(74) *Attorney, Agent, or Firm* — Sughrue Mion, PLLC; Richard C. Turner

(57) ABSTRACT

When detecting an abnormality in a portion related to control of an electric motor, a CPU that calculates a control amount for controlling the electric motor calculates a control amount different from a control amount at a normal time so as to continue the control of the electric motor and changes a threshold value for detecting the abnormality to a value different from a value at a normal time.

18 Claims, 10 Drawing Sheets

(56) References Cited

U.S. PATENT DOCUMENTS

| | | |
|---|---|---|
| 2017/0033725 A1 | 2/2017 | Koseki et al. |
| 2017/0237377 A1 | 8/2017 | Furukawa et al. |
| 2018/0006594 A1 | 1/2018 | Furukawa et al. |

FOREIGN PATENT DOCUMENTS

| | | |
|---|---|---|
| JP | 5920050 B2 | 5/2016 |
| JP | 2016135042 A | 7/2016 |
| WO | 2016/135805 A1 | 9/2016 |
| WO | 2016/135840 A1 | 9/2016 |

OTHER PUBLICATIONS

Office Action dated Mar. 10, 2020 in Japanese Application No. 2019-507997.
Extended European Search Report dated Jan. 31, 2020 in European Application No. 17903924.3.
Communication dated Oct. 6, 2020, from the Japanese Patent Office in application No. 2019507997.

* cited by examiner

ELECTRIC POWER STEERING APPARATUS

CROSS REFERENCE TO RELATED APPLICATIONS

This application is a National Stage of International Application No. PCT/JP2017/013157 filed Mar. 30, 2017.

TECHNICAL FIELD

The present invention relates to an electric power steering apparatus in which an electric motor produces assist torque for assisting steering torque produced by a vehicle driver and more particularly to an electric power steering apparatus in which a control unit for controlling the motor has a fail-safe function.

BACKGROUND ART

As is well known, an electric power steering apparatus in which an electric motor produces assist torque for assisting steering torque produced by a vehicle driver is configured in such a way as to control the electric motor based on signals from various kinds of sensors.

To date, there has been proposed an electric power steering apparatus that is provided with a backup control means for securing the continuation of control at a time when a sensor is abnormal and that when it is determined that one kind of sensor detection value is abnormal, the backup control means controls an electric motor by use of other values excluding the abnormal value (e.g., refer to Patent Document 1).

When one kind of sensor detection value is abnormal, the conventional electric power steering apparatus disclosed in Patent Document 1 utilizes other values excluding the abnormal value and performs backup control that is different from the backup control at a time when no abnormality exists so as to continue the control of the electric motor; in addition, when two or more kinds of detection values are abnormal, the conventional electric power steering apparatus stops the control of the electric motor or tries to perform additional backup control.

It is argued that because the conventional electric power steering apparatus disclosed in Patent Document 1 makes it possible that even when due to a failure in a sensor, an abnormality occurs in a detection value, driving of the electric motor is continued without utilizing the abnormal detection value so that the steering assist can be continued, and makes it possible that the driver can appropriately be aware of the occurrence of the failure, there can be prevented the situation that while the driver continues to utilize the apparatus without being aware of the failure in the apparatus, another member also fails and hence the driving of the electric motor cannot be performed, and eventually, the steering assist cannot be performed.

PRIOR ART REFERENCE

Patent Document

[Patent Document 1] Japanese Patent Publication No. 5920050

DISCLOSURE OF THE INVENTION

Problems to be Solved by the Invention

In the foregoing conventional electric power steering apparatus, even when an abnormality occurs in a sensor, the control of the electric motor can be continued as long as possible, and when an abnormality occurs in a sensor, control that is different from the control at a time when the sensor is normal is performed through the backup control; however, provided an additional abnormality at a time when the backup control is performed is detected by use of a threshold value the same as the threshold value for detecting an abnormality at a time when no abnormality occurs, it may be determined that an abnormality exists, even when no abnormality exists, or it may be determined that no abnormality exists, even when an abnormality exists. Therefore, it has been required that in order to detect an additional abnormality at a time when the backup control is performed, the contents of abnormality determination is reviewed.

The present invention has been implemented in order to solve the foregoing problem in a conventional electric power steering apparatus; the objective thereof is to provide an electric power steering apparatus in which when an abnormality in portions related to the control of an electric motor is detected and the control of the electric motor is continued, detection of an additional abnormality can be determined without performing erroneous determination.

Means for Solving the Problems

An electric power steering apparatus according to the present invention includes
an electric motor that produces assist torque, based on steering torque produced by a driver of a vehicle, and
a controller that controls the electric motor; the electric power steering apparatus is characterized
in that the controller includes
an input circuit to which information to be utilized to control the electric motor is inputted,
an inverter circuit that supplies an electric current to the electric motor,
a CPU that calculates a control amount for controlling the electric motor, based on the information inputted to the input circuit, and outputs a command signal based on the control amount, and
a driving circuit that drives the inverter circuit, based on the command signal outputted from the CPU, and
in that the CPU has an abnormality control mode in which when detecting an abnormality in a portion related to control of the electric motor, the CPU calculates a control amount that is different at least from a control amount at a normal time, in accordance with the portion in which the abnormality has occurred and the contents of the abnormality, and then continues control of the electric motor; when control of the electric motor is continued in the abnormality control mode, a threshold value for detecting the abnormality is changed to a value different from a value at a normal time, in accordance with the contents of the control in the abnormality control mode.

An electric power steering apparatus according to the present invention includes
an electric motor that produces assist torque, based on steering torque produced by a driver of a vehicle, and
a controller that controls the electric motor; the electric power steering apparatus is characterized
in that the electric motor is provided with two sets of armature windings including a first armature winding and a second armature winding that are formed in substantially the same manner,
in that the controller is formed of two sets of controllers that are formed in substantially the same manner and that include a first controller formed in such a way as to be capable of independently controlling the first armature winding and a second controller formed in such a way as to be capable of independently controlling the second armature winding, in that each of the first controller and the second controller has
- an input circuit to which information from a plurality of sensors is inputted,
- a driving circuit that generates a driving signal for driving the electric motor,
- an inverter circuit that is controlled by the driving signal, and
- a control circuit provided with a CPU that outputs a command signal for controlling the electric motor to the driving circuit, based on the information inputted to the input circuit, and in that the CPU has an abnormality control mode in which when detecting an abnormality in part of the plurality of sensors, the CPU calculates a control amount that is different at least from a control amount at a normal time, in accordance with the sensor in which the abnormality has occurred and the contents of the abnormality, and then continues control of the electric motor; when control of the electric motor is continued in the abnormality control mode, a threshold value for detecting the abnormality is changed to a value different from a value at a normal time, in accordance with the contents of the control in the abnormality control mode.

Advantage of the Invention

An electric power steering apparatus according to the present invention has an abnormality control mode in which when detecting an abnormality in a portion related to control of the electric motor, the electric power steering apparatus calculates a control amount that is different at least from a control amount at a normal time, in accordance with the portion in which the abnormality has occurred and the contents of the abnormality, and then continues control of the electric motor; when control of the electric motor is continued in the abnormality control mode, a threshold value for detecting the abnormality is changed to a value different from a value at a normal time, in accordance with the contents of the control in the abnormality control mode. As a result, it can be prevented that an abnormality is erroneously performed while control in the abnormality control mode is continued.

An electric power steering apparatus according to the present invention has an abnormality control mode in which when detecting an abnormality in part of the plurality of sensors, the electric power steering apparatus calculates a control amount that is different at least from a control amount at a normal time, in accordance with the sensor in which the abnormality has occurred and the contents of the abnormality, and then continues control of the electric motor; when control of the electric motor is continued in the abnormality control mode, a threshold value for detecting the abnormality is changed to a value different from a value at a normal time, in accordance with the contents of the control in the abnormality control mode. As a result, it can be prevented that an abnormality is erroneously performed while control in the abnormality control mode is continued.

BEST MODE FOR CARRYING OUT THE INVENTION

Embodiment 1

Figure 1:
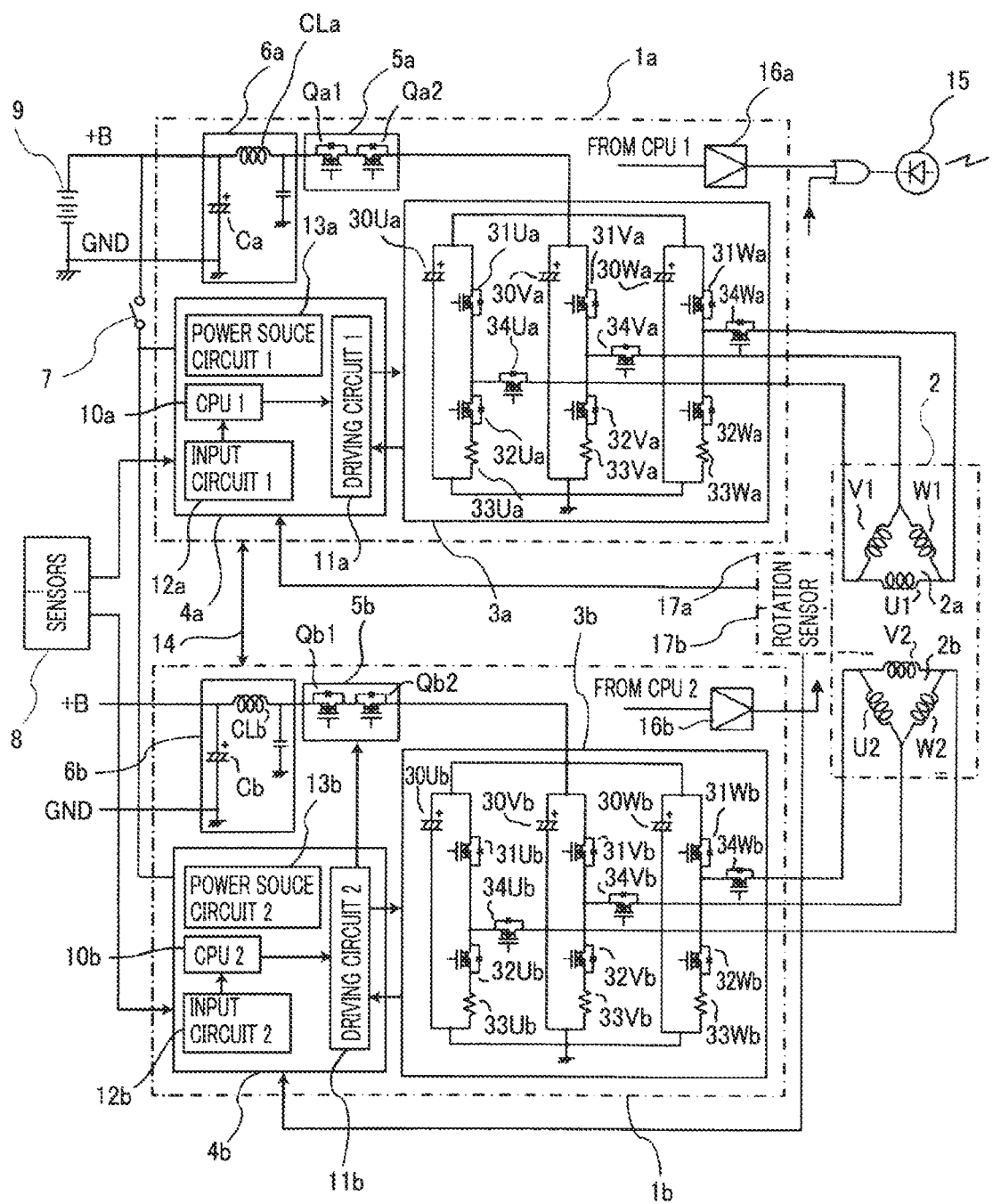
FIG. 1 is an overall circuit diagram of an electric power steering apparatus according to Embodiment 1 of the present invention.

Hereinafter, Embodiment 1 of the present invention will be explained based on the drawings. FIG. 1 is an overall circuit diagram of an electric power steering apparatus according to Embodiment 1 of the present invention. In FIG. 1, an electric motor 2 that produces assist torque for assisting steering torque produced by a vehicle driver has two sets of armature windings including a three-phase first armature winding 2a and a three-phase second armature winding 2b. The first armature winding 2a and the second armature winding 2b are configured substantially in the same manner; however, they are arranged in such a way as to be shifted by 120° electric angle from each other. Hereinafter, a control system for controlling a motor current flowing in the first armature winding 2a may be referred to as "the first group", and a control system for controlling a motor current flowing in the second armature winding 2b may be referred to as "the second group".

Two sets of control units including a first control unit 1a as a first controller and a second control unit 1b as a second controller are each configured with the same constituent members; thus, they are configured substantially in the same manner. The first control unit 1a can independently supply electric power to the first armature winding 2a; the second control unit 1b can independently supply electric power to the second armature winding 2b.

At first, the first control unit 1a out of the two sets of control units will be explained. The first control unit 1a is provided with a first control circuit unit 4a as a first control circuit equipped with a first CPU 10a, a first inverter circuit 3a that supplies a motor current to the first armature winding 2a of the electric motor 2, a first power-source relay 5a, and a first filter 6a. A pair of respective power-source terminals of the first control unit 1a are connected with a +B power source to be connected with the positive-polarity terminal of a battery 9 mounted in a vehicle and with a ground terminal GND, which is the negative-polarity terminal of the battery 9. In the first control unit 1a, the first control circuit unit 4a is supplied with the +B power source through an ignition switch 7; moreover, information pieces, for example, from a torque sensor that is mounted in the vicinity of a vehicle handwheel and detects steering torque, a speed sensor that detects the traveling speed of a vehicle, and the like are inputted from sensors 8 to the control circuit unit 4.

The first control circuit unit 4a is provided with a first power source circuit 13a, a first input circuit 12a, a first CPU 10a, and a first driving circuit 11a. The first power source circuit 13a is supplied with a power source by the battery 9 so as to produce a power source to be supplied to constituent elements of the first control circuit unit 4a.

The information pieces from the sensors 8 are transferred to the first CPU 10a by way of the first input circuit 12a provided in the first control circuit unit 4a. From those transferred information pieces, the first CPU 10a calculates a current value, which is a control amount for rotating the electric motor 2, and then outputs an output signal corresponding to the calculation value. The output signal from the first CPU 10a is transferred to the first driving circuit 11a forming a first output circuit and to the first inverter circuit 3a. The first driving circuit 11a receives a first command signal, which is the output signal from the first CPU 10a, and then outputs a first driving signal for driving after-mentioned switching devices in the first inverter circuit 3a. Because only a small current flows in the first driving circuit 11a, the first driving circuit 11a is mounted in the first control circuit unit 4a, in Embodiment 1; however, the first driving circuit 11a can be disposed also in the first inverter circuit 3a.

The first inverter circuit 3a is formed of a three-phase bridge circuit and is provided with a U-phase arm including a U-phase upper arm switching device 31Ua and a U-phase lower arm switching device 32Ua that are connected in series with each other, a V-phase arm including a V-phase upper arm switching device 31Va and a V-phase lower arm switching device 32Va that are connected in series with each other, and a W-phase arm including a W-phase upper arm switching device 31Wa and a W-phase lower arm switching device 32Wa that are connected in series with each other.

The series connection portion between the U-phase upper arm switching device 31Ua and the U-phase lower arm switching device 32Ua is connected with the connection portion between a U-phase winding U1 and a V-phase winding V1 of the first armature winding 2a by way of a U-phase motor relaying switching device 34Ua. The series connection portion between the V-phase upper arm switching device 31Va and the V-phase lower arm switching device 32Va is connected with the connection portion between the V-phase winding V1 and a W-phase winding W1 of the first armature winding 2a by way of a V-phase motor relaying switching device 34Va. The series connection portion between the W-phase upper arm switching device 31Wa and the W-phase lower arm switching device 32Wa is connected with the connection portion between the W-phase winding W1 and the U-phase winding U1 of the first armature winding 2a by way of a W-phase motor relaying switching device 34Wa.

A U-phase shunt resistor 33Ua for detecting a U-phase current is connected in series with the U-phase lower arm switching device 32Ua; a V-phase shunt resistor 33Va for detecting a V-phase current is connected in series with the V-phase lower arm switching device 32Va; a W-phase shunt resistor 33Wa for detecting a W-phase current is connected in series with the W-phase lower arm switching device 32Wa.

A U-phase noise suppression capacitor 30Ua is connected in parallel with the U-phase arm including the U-phase upper arm switching device 31Ua and the U-phase lower arm switching device 32Ua. A V-phase noise suppression capacitor 30Va is connected in parallel with the V-phase arm including the V-phase upper arm switching device 31Va and the V-phase lower arm switching device 32Va. A W-phase noise suppression capacitor 30Wa is connected in parallel with the W-phase arm including the W-phase upper arm switching device 31Wa and the W-phase lower arm switching device 32Wa.

Respective potential differences across the U-phase shunt resistor 33Ua, the V-phase shunt resistor 33Va, and the W-phase shunt resistor 33Wa and respective voltages at the winding terminals of the first armature winding 2a are transferred to the first control circuit unit 4a and are inputted to the first CPU 10a. The first CPU 10a calculates the difference between a current command value, calculated by itself based on steering torque produced by the driver and the like, and a current detection value, calculated based on the respective potential differences across the shunt resistors 33Ua, 33Va, and 33Wa, and then provides a first driving command for making the difference zero to the first driving circuit 11a.

Based on the first driving command from the first CPU 10a, the first driving circuit 11a provides driving signals to the respective gate electrodes of the U-phase upper arm switching device 31Ua and the U-phase lower arm switching device 32Ua, the V-phase upper arm switching device 31Va and the V-phase lower arm switching device 32Va, and the W-phase upper arm switching device 31Wa and the W-phase lower arm switching device 32Wa in the first inverter circuit 3a so as to perform PWM (Pulse Width Modulation) control of the switching devices.

As described above, the first control unit 1a performs feedback control in such a way that the difference between the current command value and the current detection value becomes zero, so that a desired motor current is supplied to the first armature winding 2a and hence assist torque for assisting steering torque produced by the driver is produced in the electric motor 2.

Moreover, the first control unit 1a is provided with the first power-source relay 5a that performs on/off operation of power-source supply from the +B power source of the battery 9 to the first inverter circuit 3a. The first power-source relay 5a is formed of a power-source relaying switching device Qa1 and a power-source relaying switching device Qa2 that are connected in series with each other. Each of the power-source relaying switching device Qa1 and the power-source relaying switching device Qa2 has a parasitic diode that is connected in parallel therewith; the parasitic diode connected in parallel with the power-source relaying switching device Qa1 and the parasitic diode connected in parallel with the power-source relaying switching device Qa2 are connected with each other in such a way that the respective polarities thereof are opposite to each other.

A driving signal from the first control circuit unit 4a performs on/off operation of the power-source relaying switching devices Qa1 and Qa2, so that the first power-source relay 5a can perform on/off operation of a current to be supplied to the first armature winding 2a of the electric motor 2. Because large currents flow in the power-source relaying switching devices Qa1 and Qa2 of the first power-source relay 5a and hence heat is generated in each of them, it may be allowed that the first power-source-relay switching device 5a is included in the first inverter circuit 3a.

By being on/off-driven by driving signals from the first control circuit unit 4a, the U-phase motor relaying switching device 34Ua, the V-phase motor relaying switching device 34Va, and the W-phase motor relaying switching device 34Wa provided in the first inverter circuit 3a can separately perform on/off operation of currents to be supplied from the first inverter circuit 3a to the U-phase winding U1, the V-phase winding V1, and the W-phase winding W1, respectively, of the first armature winding 2a.

The first CPU 10a has an abnormality detection function of detecting an abnormality in the first driving circuit 11a, the first inverter circuit 3a, the first armature winding 2a or the like, in addition to performing calculation of a current value, which is a control amount for rotating the foregoing electric motor, based on inputted various kinds of information pieces, such as a steering torque detection value and a vehicle speed, from the sensors 8; when an abnormality in these units is detected, it is made possible to turn off the upper-arm switching device, the lower-arm switching device, and the motor relaying switching device of the phase in which the abnormality is detected, so that for example, only the current supply to a predetermined phase is cut off in accordance with the abnormality. Alternatively, it is also made possible that in the case where the foregoing abnormality is detected, the first power-source relay 5a is turned off in order to cut off the power source itself to be supplied to the first control unit 1a.

As described above, the first inverter circuit 3a is PWM-driven by a driving signal that is provided from the first driving circuit 11a, based on the first driving command from the first CPU 10a; however, due to turn-on/off of the respective switching devices in the first inverter circuit 3a through the PWM driving, switching noise occurs. Accordingly, in order to suppress the switching noise from being emitted, the first filter circuit 6a including a filter capacitor Ca and a filter coil CLa is disposed at the input side of the first inverter circuit 3a, by way of the first power-source relay 5a.

Next, the second control unit 1b will be explained. The second control unit 1b is provided with a second control circuit unit 4b as a second control circuit equipped with a second CPU 10b, a second inverter circuit 3b that supplies a motor current to the second armature winding 2b of the electric motor 2, a second power-source relay 5b, and a second filter 6b. A pair of respective power-source terminals of the second control unit 1b are connected with a +B power source to be connected with the positive-polarity terminal of the battery 9 mounted in a vehicle and with a ground terminal GND, which is the negative-polarity terminal of the battery 9. In the second control unit 1b, the second control circuit unit 4b is supplied with the +B power source through the ignition switch 7; moreover, information pieces, for example, from a torque sensor that is mounted in the vicinity of a vehicle handwheel and detects steering torque, a speed sensor that detects the traveling speed of a vehicle, and the like are inputted from sensors 8.

The second control circuit unit 4b is provided with a second power source circuit 13b, a second input circuit 12b, a second CPU 10b, and a second driving circuit 11b. The second power source circuit 13b is supplied with a power source by the battery 9 so as to produce a power source to be supplied to constituent elements of the second control circuit unit 4b.

The information pieces from the sensors 8 are transferred to the second CPU 10b by way of the second input circuit 12b provided in the second control circuit unit 4b. From those transferred information pieces, the second CPU 10b calculates a current value, which is a control amount for rotating the electric motor 2, and then outputs an output signal corresponding to the calculation value. The output signal from the second CPU 10b is transferred to the second driving circuit 11b forming a second output circuit and to the second inverter circuit 3b. The second driving circuit 11b receives a second command signal, which is the output signal from the second CPU 10b, and then outputs a second driving signal for driving after-mentioned switching devices in the second inverter circuit 3b. Because only a small current flows in the second driving circuit 11b, the second driving circuit 11b is mounted in the second control circuit unit 4b, in Embodiment 1; however, the second driving circuit 11b can be disposed also in the second inverter circuit 3b.

The second inverter circuit 3b is formed of a three-phase bridge circuit and is provided with a U-phase arm including a U-phase upper arm switching device 31Ub and a U-phase lower arm switching device 32Ub that are connected in series with each other, a V-phase arm including a V-phase upper arm switching device 31Vb and a V-phase lower arm switching device 32Vb that are connected in series with each other, and a W-phase arm including a W-phase upper arm switching device 31Wb and a W-phase lower arm switching device 32Wb that are connected in series with each other.

The series connection portion between the U-phase upper arm switching device 31Ub and the U-phase lower arm switching device 32Ub is connected with the connection portion between a U-phase winding U2 and a V-phase winding V2 of the second armature winding 2b by way of a U-phase motor relaying switching device 34Ub. The series connection portion between the V-phase upper arm switching device 31Vb and the V-phase lower arm switching device 32Vb is connected with the connection portion between a V-phase winding V2 and a W-phase winding W2 of the second armature winding 2b by way of a V-phase motor relaying switching device 34Vb. The series connection portion between the W-phase upper arm switching device 31Wb and the W-phase lower arm switching device 32Wb is connected with the connection portion between the W-phase winding W2 and the U-phase winding U2 of the second armature winding 2b by way of a W-phase motor relaying switching device 34Wb.

A U-phase shunt resistor 33Ub for detecting a U-phase current is connected in series with the U-phase lower arm switching device 32Ub; a V-phase shunt resistor 33Vb for detecting a V-phase current is connected in series with the V-phase lower arm switching device 32Vb; a W-phase shunt resistor 33Wb for detecting a W-phase current is connected in series with the W-phase lower arm switching device 32Wb.

A U-phase noise suppression capacitor 30Ub is connected in parallel with the U-phase arm including the U-phase upper arm switching device 31Ub and the U-phase lower arm switching device 32Ub. A V-phase noise suppression capacitor 30Vb is connected in parallel with the V-phase arm including the V-phase upper arm switching device 31Vb and the V-phase lower arm switching device 32Vb. A W-phase noise suppression capacitor 30Wb is connected in parallel with the W-phase arm including the W-phase upper arm switching device 31Wb and the W-phase lower arm switching device 32Wb.

Respective potential differences across the U-phase shunt resistor 33Ub, the V-phase shunt resistor 33Vb, and W-phase shunt resistor 33Wb and respective voltages at the winding terminals of the second armature winding 2b are transferred to the second control circuit unit 4b and are inputted to the second CPU 10b. The second CPU 10b calculates the difference between a current command value, calculated by itself based on steering torque produced by the driver and the like, and a current detection value, calculated based on the respective potential differences across the shunt resistors 33Ub, 33Vb, and 33Wb, and then provides a second driving command for making the difference zero to the second driving circuit 11b.

Based on the second driving command from the second CPU 10b, the second driving circuit 11b provides driving signals to the respective gate electrodes of the U-phase upper arm switching device 31Ub and the U-phase lower arm switching device 32Ub, the V-phase upper arm switching device 31Vb and the V-phase lower arm switching device 32Vb, and the W-phase upper arm switching device 31Wb and the W-phase lower arm switching device 32Wb in the second inverter circuit 3b so as to perform PWM control of the switching devices.

As described above, the second control unit 1b performs feedback control in such a way that the difference between the current command value and the current detection value becomes zero, so that a desired motor current is supplied to the second armature winding 2b and hence assist torque for assisting steering torque produced by the driver is produced in the electric motor 2.

Moreover, the second control unit 1b is provided with the second power-source relay 5b that performs on/off operation of power-source supply from the +B power source of the battery 9 to the second inverter circuit 3b. The second power-source relay 5b is formed of a power-source relaying switching device Qb1 and a power-source relaying switching device Qb2 that are connected in series with each other. Each of the power-source relaying switching device Qb1 and the power-source relaying switching device Qb2 has a parasitic diode that is connected in parallel therewith; the parasitic diode connected in parallel with the power-source relaying switching device Qb1 and the parasitic diode connected in parallel with the power-source relaying switching device Qb2 are connected with each other in such a way that the respective polarities thereof are opposite to each other.

When a driving signal from the second control circuit unit 4b performs on/off operation of the power-source relaying switching devices Qb1 and Qb2, the second power-source relay 5b can perform on/off operation of a current to be supplied to the second armature winding 2b of the electric motor 2. Because large currents flow in the power-source relaying switching devices Qb1 and Qb2 of second power-source relay 5b and hence heat is generated in each of them, it may be allowed that the second power-source relay 5b is included in the second inverter circuit 3b.

By being on/off-driven by driving signals from the second control circuit unit 4b, the U-phase motor relaying switching device 34Ub, the V-phase motor relaying switching device 34Vb, and the W-phase motor relaying switching device 34Wb provided in the second inverter circuit 3b can separately perform on/off operation of currents to be supplied from the second inverter circuit 3b to the U-phase winding U2, the V-phase winding V2, and the W-phase winding W2, respectively, of the second armature winding 2b.

The second CPU 10b has an abnormality detection function of detecting an abnormality in the second driving circuit 11b, the second inverter circuit 3b, the second armature winding 2b, or the like, in addition to various kinds of information pieces, such as a steering torque detection value and a vehicle speed, from the sensors 8; when an abnormality in these units is detected, it is made possible to turn off the upper-arm switching device, the lower-arm switching device, and the motor relaying switching device of the phase in which the abnormality is detected, so that for example, only the current supply to a predetermined phase is cut off in accordance with the abnormality. Alternatively, it is also made possible that in the case where the foregoing abnormality is detected, the second power-source relay 5b is turned off in order to cut off the power source itself to be supplied to the second control unit 1b.

As described above, the second inverter circuit 3b is PWM-driven by a driving signal that is provided from the second driving circuit 11b, based on the second driving command from the second CPU 10b; however, due to turn-on/off of the respective switching devices in the second inverter circuit 3b through the PWM driving, switching noise occurs. Accordingly, in order to suppress the switching noise from being emitted, the second filter 6b including a filter capacitor Cb and a filter coil CLb is disposed at the input side of the second inverter circuit 3b, by way of the second power-source relay 5b.

The electric motor 2 is formed of a brushless electric motor in which as described above, the two sets of armature windings including the three-phase first armature winding 2a and the three-phase second armature winding 2b are each delta-connected. Because being a brushless electric motor, the motor 2 is equipped with a first rotation sensor 17a and a second rotation sensor 17b for detecting the rotation position of the rotor. As described above, in order to secure the redundancy, two sets of rotation sensors, which are substantially in the same configuration, are provided. The information on the rotation position of the rotor, detected by the first rotation sensor 17a, is transferred to the first control circuit unit 4a and then is inputted to the first input circuit 12a. The information on the rotation position of the rotor, detected by the second rotation sensor 17b, is transferred to the second control circuit unit 4b and then is inputted to the second input circuit 12b.

The electric motor 2 may be not a three-phase delta-connection brushless motor but a three-phase star connection brushless motor or a double-pole two-pair brush motor. As is the case with a conventional apparatus, the winding specification of the armature winding may be either distributed winding or concentrated winding. Furthermore, the electric motor 2 may be a so-called tandem electric motor having two stators. In this case, it may be allowed that only one set of armature winding is provided or that two sets of armature windings are provided and driving is performed by collaboration of these armature windings; what matters is that any configuration is allowed as long as a desired motor rotation speed is achieved and desired torque can be outputted.

A notification means 15 is configured, for example, in such a way as to be able to light a lamp; in the case where the first CPU 10a detects the foregoing abnormality, action such as lighting a lamp is taken based on an alarm signal to be outputted from the first CPU 10a by way of the first output circuit 16a, so that the abnormality is notified to the driver; alternatively, in the case where the second CPU 10*b* detects the foregoing abnormality, an action such as lighting a lamp is taken based on an alarm signal to be outputted from the second CPU 10*b* by way of the second output circuit 16*b*, so that the abnormality is notified to the driver.

As described above, each of the first control unit 1*a* and the second control unit 1*b* independently utilizes input information and the calculation value for a control amount and is capable of independently driving the electric motor 2. The first control unit 1*a* and the second control unit 1*b* are connected with each other through a communication line 14 so that data and information of the opposite party can be transmitted and received. The communication line 14 connects the first CPU 10*a* with the second CPU 10*b*, so that the first CPU 10*a* can comprehend the condition of the second CPU 10*b*, and vice versa. For example, when the first CPU 10*a* detects the foregoing abnormality and hence turns off the foregoing predetermined switching device, the contents of abnormality detection, abnormal components, the contents of motor driving, and the like can be transferred to the second CPU 10*b*. When an abnormality occurs in any one of the CPUs themselves, the periodic predetermined-format communication signal can be neither transmitted nor received; thus, it is also made possible that one of the CPUs detects the fact that an abnormality has occurred in the other one of the CPUs.

Figure 2:
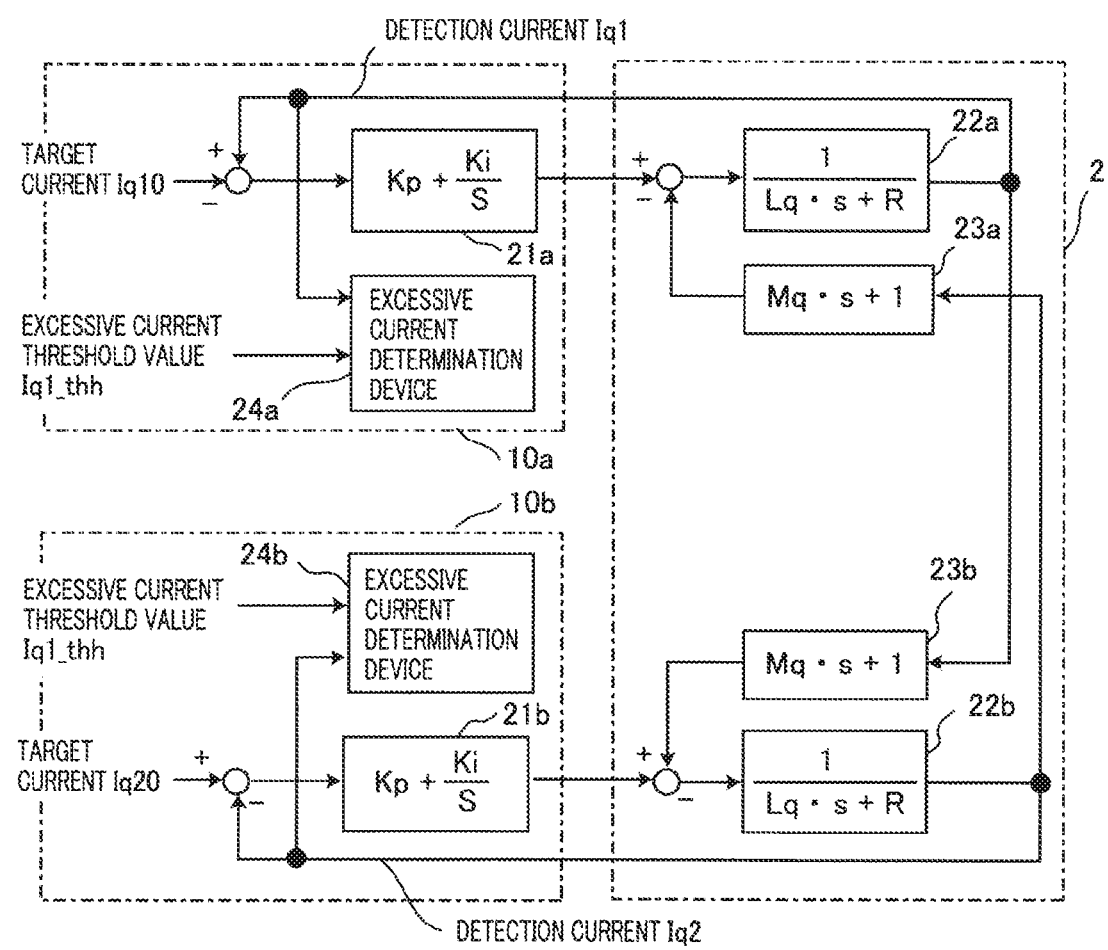
FIG. 2 is a block diagram of a control unit as a controller in the electric power steering apparatus, which is a basis of the present invention.

Here, at first, the control unit in the electric power steering apparatus, which is a basis of the present invention will be explained. FIG. 2 is a control block diagram for explaining a control unit in the electric power steering apparatus, which is a basis of the present invention; FIG. 2 represents the first CPU 10*a* in the first control circuit unit 4*a*, the second CPU 10*b* in the second control circuit unit 4*b*, and the electric motor 2 that are represented in FIG. 1.

In FIG. 2, the electric motor 2, which is a brushless motor, has, as control elements for the first armature winding 2*a*, a first control block 22*a* including a q-axis self-inductance Lq and an armature resistance R and a first interference block 23*a* that provides, through a mutual inductance Mq, a control subject with an effect from a motor current flowing in the second armature winding 2*b*. Furthermore, the electric motor 2 has, as control elements for the second armature winding 2*b*, a second control block 22*b* including the q-axis self-inductance Lq and the armature resistance R and a second interference block 23*b* that provides, through the mutual inductance Mq, a control subject with an effect from a motor current flowing in the first armature winding 2*a*.

The first CPU 10*a* in the first control circuit unit 4*a* has a first PI controller 21*a* and an after-mentioned first excessive current determination device 24*a*. In the first PI controller 21*a*, Kp, Ki, and s denote a proportional gain, an integration gain, and a Laplace operator, respectively. Similarly, the second CPU 10*b* in the second control circuit unit 4*b* has a second PI controller 21*b* and an after-mentioned second excessive current determination device 24*b*. In the second PI controller 21*b*, Kp, Ki, and s denote the proportional gain, the integration gain, and the Laplace operator, respectively.

The first CPU 10*a* for controlling a motor current in the first armature winding 2*a* compares a detection current Iq1 of the motor current flowing in the first armature winding 2*a* with a target current Iq10; the PI controller 21*a* performs feedback-control of the motor current in the first armature winding 2*a* so that the detection current Iq1 keeps track of the target current Iq10. When the detection current Iq1 of the motor current flowing in the first armature winding 2*a* exceeds an excessive current determination threshold value Iq1_thh, the first excessive current determination device 24*a* determines that the motor driving system for the first armature winding 2*a* is out of order or abnormal.

Similarly, the second CPU 10*b* for controlling a motor current in the second armature winding 2*b* compares a detection current Iq2 of the motor current flowing in the second armature winding 2*b* with a target current Iq20; the second PI controller 21*b* performs feedback-control of the motor current in the second armature winding 2*b* so that the detection current Iq2 keeps track of the target current Iq20. When the detection current Iq2 of the motor current flowing in the second armature winding 2*b* exceeds the excessive current determination threshold value Iq1_thh, the second excessive current determination device 24*b* determines that the motor driving system for the second armature winding 2*b* is out of order or abnormal.

In the electric power steering apparatus, which is a basis of the present invention, the excessive current determination threshold value Iq1_thh as an abnormality determination threshold value is set to a fixed value, as described later. In the case where it is assumed that when in FIG. 2, Kp, Ki, Lq, R, and Mq are set to 0.4, 75, 100 [µH], 0.02 [Ω], and 50 [µH], respectively, and the target current Iq10 is fixed to a rated current 100 [Arms], an abnormality in the circuit or the like makes the detection current Iq2 in the second armature winding 2*b* change from 100 [Arms] to 0 [Arms], the detection current Iq1, of the motor current in the first armature winding 2*a*, that is generated due to the mutual inductance Mq, is simulated as represented in each of FIGS. 3A and 3B.

Figure 3A:
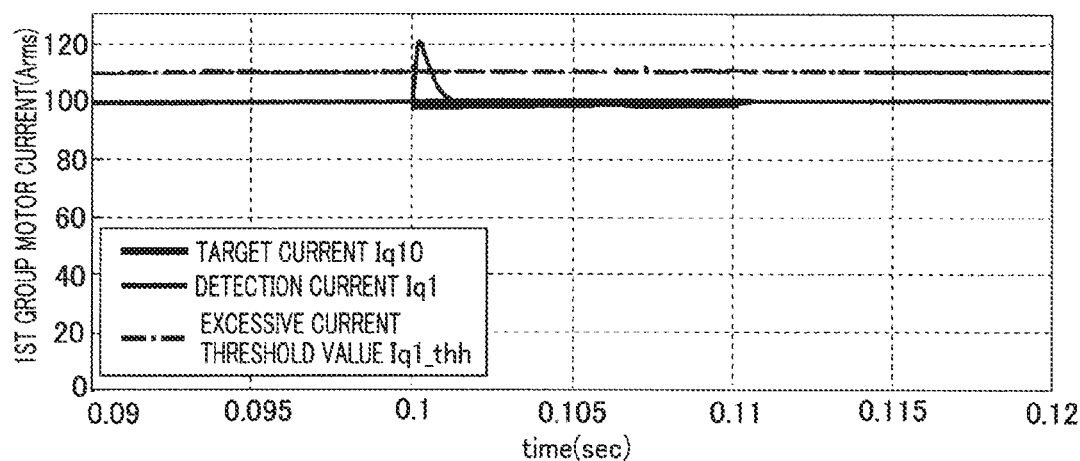
FIG. 3A is a timing chart for explaining the operation of the electric power steering apparatus, which is a basis of the present invention.
Figure 3B:
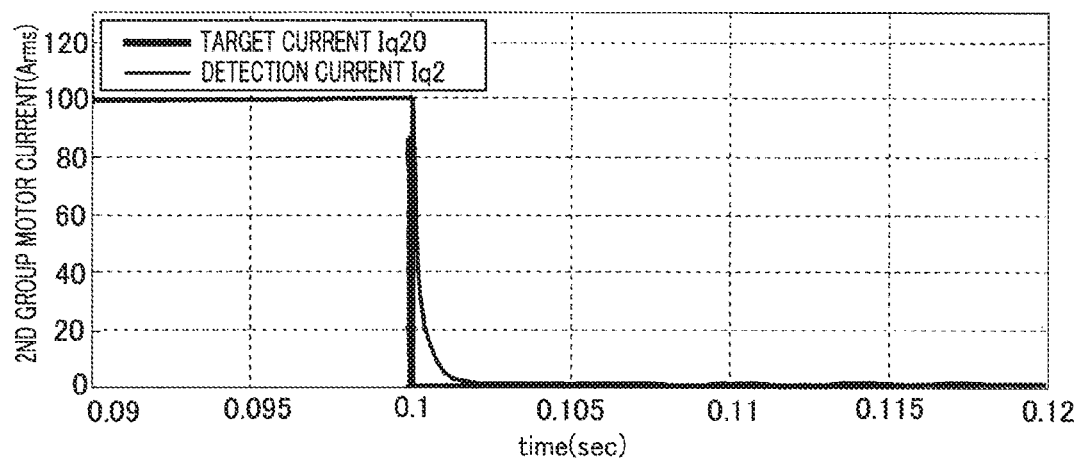
FIG. 3B is a timing chart for explaining the operation of the electric power steering apparatus, which is a basis of the present invention.

That is to say, FIG. 3A is a timing chart for explaining the operation of the electric power steering apparatus, which is a basis of the present invention; the ordinate denotes the target current Iq10 [Arms] in the first armature winding 2*a*, the detection current Iq1 [Arms], and the excessive current determination threshold value Iq1_thh [Arms] as an abnormality determination threshold value; the abscissa denotes the time [sec]. In this situation, the excessive current determination threshold value Iq1_thh is set to a predetermined fixed value, as described above. FIG. 3B is a timing chart for explaining the operation of the electric power steering apparatus, which is a basis of the present invention; the ordinate denotes the target current Iq20 [Arms] in the second armature winding 2*b* and the detection current Iq2 [Arms]; the abscissa denotes the time [sec].

As represented in FIGS. 3A and 3B, in the case where due to the first interference block 23*a*, the detection current Iq2 of the motor current flowing in the second armature winding 2*b* rapidly decreases at a time point "0.1", an effect obtained by multiplying the differential component of the detection current Iq2 by the mutual inductance Mq is provided to the detection current Iq1 of the motor current flowing in the first armature winding 2*a*; thus, at the time point "0.1", the detection current Iq1 of the motor current overshoots the target current Iq10, even when the first control block 22*a* for the first armature winding 2*a* is normal.

Figure 4:
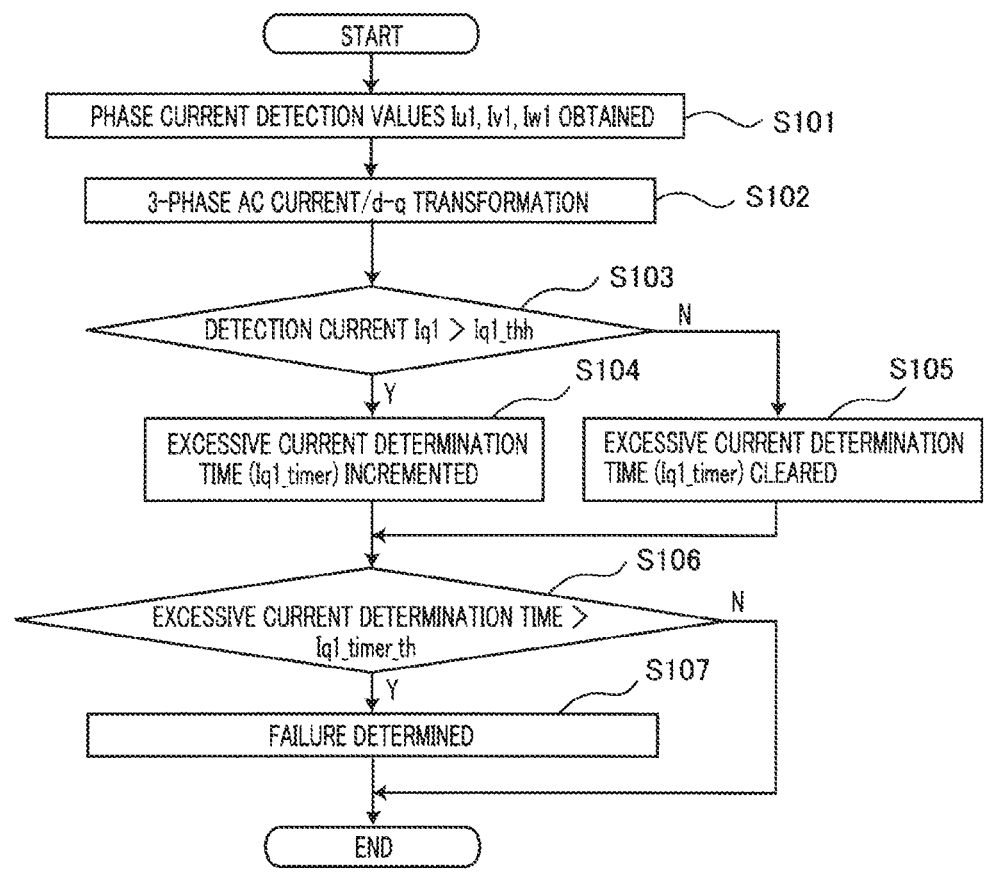
FIG. 4 is a flowchart for explaining the operation of the electric power steering apparatus, which is a basis of the present invention.

FIG. 4 is a flowchart for explaining the operation of the electric power steering apparatus, which is a basis of the present invention; there is represented the operation of an excessive-current detection abnormality determination in which a short-circuit failure in the first inverter circuit 3*a* or the second inverter circuit 3*b* in FIG. 1 or a failure due to a short-circuit among the lines of the respective phases are determined by detecting an excessive current in the motor. The flowchart represented in FIG. 4 is periodically implemented by each of the first CPU 10*a* and the second CPU 10*b*. Because the first CPU 10*a* and the second CPU 10*b* each perform the same processing, the contents of the processing performed by the first CPU 10a will be explained.

In the step S101 in FIG. 4, the first CPU 10a receives a U-phase motor current Iu1, a V-phase motor current Iv1, and a W-phase motor current Iw1 detected by the U-phase shunt resistor 33Ua, the V-phase shunt resistor 33Va, and the W-phase shunt resistor 33Wa, respectively, in FIG. 1, by way of the first input circuit 12a.

Next, the step S101 is followed by the step S102. In general, in three-phase motor current control, current control is performed by use of a q-axis current Iq, which is a current component of torque, and a d-axis current Id, which is a current component in a magnetic-field flux direction; thus, in the step S102, the U-phase motor current Iu1, the V-phase motor current Iv1, and the W-phase motor current Iw1 that have been detected in the step S101 are transformed into respective [d-q]-axis currents. In the following explanation, for simplicity, it is assumed that the d-axis current, which is a current component in a magnetic-field flux direction, is not controlled; in this explanation, each of the q-axis currents that are [three-phase/d-q]-transformed from the detected U-phase motor current Iu1, the detected V-phase motor current Iv1, and the detected W-phase motor current Iw1 is referred to as a detection current Iq1.

Next, the step S102 is followed by the step S103, where it is determined whether or not the detection current Iq1 is larger than the excessive current determination threshold value Iq1_thh. In the case where the detection current Iq1 is larger than the excessive current determination threshold value Iq1_thh, it is determined that an excessive current has been detected (Y), and the step S103 is followed by the step S104, where an excessive current determination time (Iq1_timer) is incremented; then, the step S104 is followed by the step S106.

In this explanation, for the sake of explanation, an excessive current in the motor is determined by setting the value of each of the q-axis currents that are [three-phase/d-q]-transformed from the detected U-phase motor current Iu1, the detected V-phase motor current Iv1, and the detected W-phase motor current Iw1 to the detection current Iq1; however, when an excessive current in the motor is determined by directly utilizing the detected U-phase motor current Iu1, the detected V-phase motor current Iv1, and the detected W-phase motor current Iw1, the same result is obtained.

In contrast, in the case where the detection current Iq1 is the same as or smaller than the excessive current determination threshold value Iq1_thh, it is determined that no excessive current has been detected (N), and the step S103 is followed by the step S105, where the excessive current determination time Iq1_timer is cleared. In this situation, as represented in FIG. 3A, the excessive current determination threshold value Iq1_thh is set to a fixed value, for example, a value that is 10 percent as large as the rated current.

In the case of the foregoing technology, which is a basis of the present invention, when as represented in FIG. 3A, the excessive current determination threshold value Iq1_thh is set to a fixed value, the value obtained by multiplying the variation component of the motor current in the second armature winding 2b, which is represented as the second control block 22b in FIG. 2, by the mutual inductance Mq, which is represented as the first interference block 23a in FIG. 2, provides an effect to the control of the motor current in the first armature winding 2a. Accordingly, even when the motor driving system for the first armature winding 2a is normal, the motor current in the first armature winding 2a exceeds the excessive current determination threshold value Iq1_thh and hence the excessive current determination time Iq1_timer is incremented in the foregoing step S104.

Meanwhile, the value obtained by multiplying the variation component of the motor current in the first armature winding 2a, which is represented as the first control block 22a in FIG. 2, by the mutual inductance Mq, which is represented as the second interference block 23b in FIG. 2, provides an effect to the control of the motor current in the second armature winding 2b. Accordingly, even when the motor driving system for the second armature winding 2b is normal, the motor current in the second armature winding 2b exceeds the excessive current determination threshold value Iq1_thh and hence the excessive current determination time Iq1_timer is incremented in the foregoing step S104.

In FIG. 4, when in the step S104, the excessive current determination time Iq1_timer is incremented and then the step S104 is followed by the step S106, it is determined whether or not the excessive current determination time Iq1_timer is larger than a determination time threshold value Iq1_timer_th; in the case where the excessive current determination time Iq1_timer is larger than the determination time threshold value Iq1_timer_th (Y), the step S106 is followed by the step S107, where a failure is determined; then, the processing is ended. In the case where it is determined in the step S106 that the excessive current determination time Iq1_timer is the same as or smaller than the determination time threshold value Iq1_timer_th (N), the processing is ended.

As described above, in the technology, which is a basis of the present invention, there exists the following problem: because the excessive current determination threshold value Iq1_thh is set to a fixed value, the motor current in the first armature winding 2a exceeds the excessive current determination threshold value Iq1_thh even when the motor driving system for the first armature winding 2a is normal and hence in the foregoing step S104, the excessive current determination time Iq1_timer is incremented and it is determined that motor driving system for the first armature winding 2a is out of order or abnormal; similarly, because even when the motor driving system for the second armature winding 2b is normal, the motor current in the second armature winding 2b exceeds the excessive current determination threshold value Iq1_thh, the excessive current determination time Iq1_timer is incremented in the foregoing step S104 and hence it is determined that motor driving system for the second armature winding 2b is out of order or abnormal.

Figure 5:
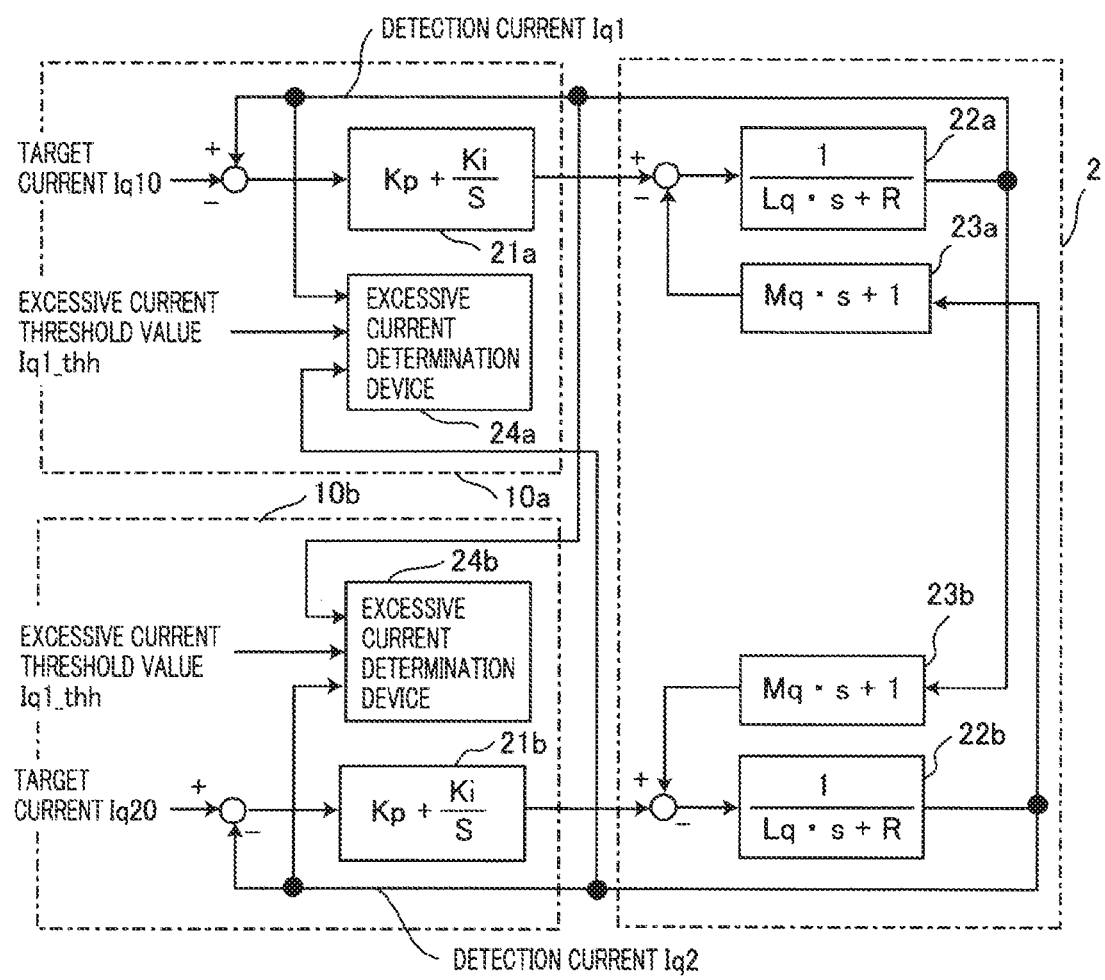
FIG. 5 is a block diagram of a control unit as a controller in the electric power steering apparatus according to Embodiment 1 of the present invention.

Next, the electric power steering apparatus according to Embodiment 1 of the present invention will be explained. FIG. 5 is a block diagram of the control units in the electric power steering apparatus according to Embodiment 1 of the present invention; FIG. 5 represents the first CPU 10a in the first control circuit unit 4a, the second CPU 10b in the second control circuit unit 4b, and the electric motor 2 that are represented in FIG. 1.

As represented in FIG. 5, In the electric power steering apparatus according to Embodiment 1 of the present invention, the first CPU 10a for controlling a motor current flowing in the first armature winding 2a receives a motor current flowing in the second armature winding 2b; there is calculated the effect that is caused by the preliminarily set motor mutual inductance Mq, motor self-inductance Lq, and motor armature resistance R and that is provided to the motor current flowing in the first armature winding 2a; in the case where the calculation value is larger than the preliminarily set excessive current determination threshold value Iq1_thh, the first excessive current determination device 24a, configured in such a way as to replace the excessive current determination threshold value, suppresses an erroneous determination caused by the effect of the motor current in the second armature winding 2b.

Similarly, the second CPU 10b for controlling the motor current flowing in the second armature winding 2b receives the motor current flowing in the first armature winding 2a; there is calculated the effect that is caused by the preliminarily set motor mutual inductance Mq, motor self-inductance Lq, and motor armature resistance R and that is provided to the motor current flowing in the first armature winding 2a; in the case where the calculation value is larger than the preliminarily set excessive current determination threshold value Iq1_thh, the second excessive current determination device 24b, configured in such a way as to replace the excessive current determination threshold value, suppresses an erroneous determination caused by the effect of the motor current in the first armature winding 2a.

In FIG. 5, the electric motor 2, which is a brushless motor, has, as control elements for the first armature winding 2a, the first control block 22a including a q-axis self-inductance Lq and an armature resistance R and the first interference block 23a that provides, through a mutual inductance Mq, a control subject with an effect from a motor current flowing in the second armature winding 2b. Furthermore, the electric motor 2 has, as control elements for the second armature winding 2b, the second control block 22b including the q-axis self-inductance Lq and the armature resistance R and the second interference block 23b that provides, through the mutual inductance Mq, a control subject with an effect from a motor current flowing in the first armature winding 2a.

The first CPU 10a in the first control circuit unit 4a has the first PI controller 21a and the first excessive current determination device 24a. In the first PI controller 21a, Kp, Ki, and s denote a proportional gain, an integration gain, and a Laplace operator, respectively. Similarly, the second CPU 10b in the second control circuit unit 4b has the second PI controller 21b and the second excessive current determination device 24b. In the second PI controller 21b, Kp, Ki, and s denote the proportional gain, the integration gain, and the Laplace operator, respectively.

The first CPU 10a for controlling a motor current in the first armature winding 2a compares the detection current Iq1 of the motor current flowing in the first armature winding 2a with the target current Iq10; the PI controller 21a performs feedback-control of the motor current in the first armature winding 2a so that the detection current Iq1 keeps track of the target current Iq10. Similarly, the second CPU 10b for controlling a motor current in the second armature winding 2b compares the detection current Iq2 of the motor current flowing in the second armature winding 2b with the target current Iq20; the second PI controller 21b performs feedback-control of the motor current in the second armature winding 2b so that the detection current Iq2 keeps track of the target current Iq20.

The first excessive current determination device 24a in the first CPU 10a receives the excessive current determination threshold value Iq1_thh, the detection current Iq1 of the motor current in the first armature winding 2a, and the detection current Iq2 of the motor current in the second armature winding 2b; there is calculated the effect that is caused by the preliminarily set motor mutual inductance Mq, motor self-inductance Lq, and motor armature resistance R and that is provided to the motor current flowing in the first armature winding 2a; in the case where the calculation value is larger than the preliminarily set excessive current determination threshold value Iq1_thh, the excessive current determination threshold value is replaced.

Similarly, the second excessive current determination device 24b in the second CPU 10b receives the excessive current determination threshold value Iq1_thh, the detection current Iq2 of the motor current in the second armature winding 2b, and the detection current Iq1 of the motor current in the first armature winding 2a; there is calculated the effect that is caused by the preliminarily set motor mutual inductance Mq, motor self-inductance Lq, and motor armature resistance R and that is provided to the motor current flowing in the second armature winding 2b; in the case where the calculation value is larger than the preliminarily set excessive current determination threshold value Iq1_thh, the excessive current determination threshold value is replaced.

Figure 6:
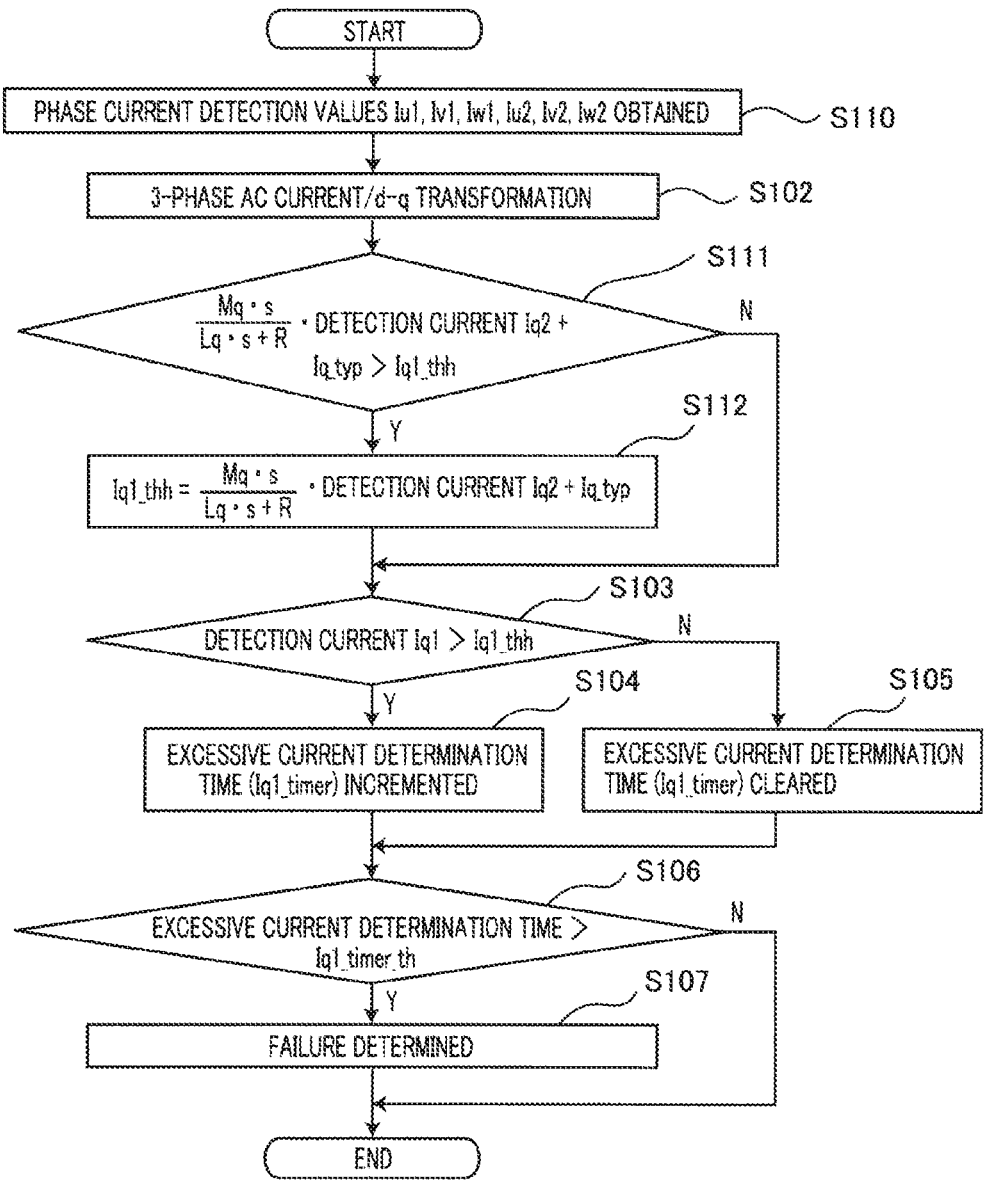
FIG. 6 is a flowchart for explaining the operation of the electric power steering apparatus according to Embodiment 1 of the present invention.

FIG. 6 is a flowchart for explaining the operation of the electric power steering apparatus according to Embodiment 1 of the present invention. The flowchart represented in FIG. 6 is obtained by replacing the step S101 in the flowchart represented in foregoing FIG. 4 by the step S110 and by inserting the steps S111 and S112 between the step S102 and the step S103 in the flowchart represented in foregoing FIG. 4; the other parts are substantially the same as those of the flowchart represented in FIG. 4. In the following explanation, the difference from the flowchart in FIG. 4 will mainly be explained. The flowchart represented in FIG. 6 is periodically implemented by each of the first CPU 10a and the second CPU 10b. Because the first CPU 10a and the second CPU 10b each perform the same processing, the contents of the processing performed by the first CPU 10a will mainly be explained.

In FIG. 6, at first, in the step S110, the U-phase motor current Iu1, the V-phase motor current Iv1, and the W-phase motor current Iw1, as the currents flowing in the first armature winding 2a, and a U-phase motor current Iu2, a V-phase motor current Iv2, and a W-phase motor current Iw2, as the currents flowing in the second armature winding 2b, are obtained. With regard to the obtainment of the motor currents flowing in the second armature winding 2b, the second CPU 10b also detects the motor currents flowing in the second armature winding 2b; thus, it may be allowed that through communication between the first CPU 10a and the second CPU 10b, the motor currents flowing in the second armature winding 2b are obtained.

Next, in the step S102, the U-phase motor current Iu1, the V-phase motor current Iv1, and the W-phase motor current Iw1, which have been detected in the step S101, and the U-phase motor current Iu2, the V-phase motor current Iv2, and the W-phase motor current Iw2, as the currents flowing in the second armature winding 2b, are transformed into the detection current Iq1 of the motor current flowing in the first armature winding 2a and the detection current Iq2 of the motor current flowing in the second armature winding 2b, based on the transformation into the respective [d-q]-axis currents.

For simplicity, it is assumed that the d-axis current, which is a current component in a magnetic-field flux direction, is not controlled; in this explanation, each of the q-axis currents that are [three-phase/d-q]-transformed from the detected U-phase motor current Iu1, the detected V-phase motor current Iv1, and the detected W-phase motor current Iw1 is referred to as a detection current Iq1, and each of the q-axis currents that are [three-phase/d-q]-transformed from the U-phase motor current Iu2, the V-phase motor current Iv2, and the W-phase motor current Iw2 is referred to as a detection current Iq2.

Next, in the step S111, based on the equation (1) below, the first CPU 10*a* represented in FIG. 5 calculates the effect that is caused by a change in the motor current flowing in the second armature winding 2*b* and is provided to the detection current Iq1, by use of the first interference block 23*a* and the first control block 22*a*.

$$\text{detection current } Iq2 \times (Mq \cdot s + 1) \times \left(\frac{1}{Lq \cdot s + 1}\right) = \qquad (1)$$

$$\frac{Mq \cdot s}{Lq \cdot s + R} \text{ detection current } Iq2$$

The following explanation will be made under the assumption that in FIG. 5, Kp, Ki, Lq, R, and Mq are set to 0.4, 75, 100 [pH], 0.02 [Ω], and 50 [μH], respectively, and the target current Iq1 is fixed to a rated current 100 [Arms] and that an abnormality in the circuit or the like makes the detection current Iq2 in the second armature winding 2*b* change from 100 [Arms] to 0 [Arms].

In the case where the value obtained by adding 100 [Arms], which is a rated current Iq_typ, to the value calculated based on the foregoing equation (1) is larger than a preliminarily set excessive current determination threshold value Iq1_thh, i.e., the rated current Iq_typ×1.1 (=110 [Arms], which is 10% as large as the rated current), it is determined that the effect that is caused by a change in the motor current flowing in the first armature winding 2*a* and the mutual inductance and is provided to the motor current flowing in the first armature winding 2*a* is large, and the excessive current determination threshold value is replaced by the value expressed by the equation (2) below in the step S112; then, the step S112 is followed by the step S103.

$$\text{Iq1\_thh} = \frac{Mq \cdot s}{Lq \cdot s + R} \cdot \text{detection current } Iq2 + \text{Iq\_typ} \qquad (2)$$

In contrast, in the case where the result of the calculation based on the foregoing equation (1) is the same as or smaller than the excessive current determination threshold value Iq1_thh, it is determined that the effect caused by a change in the motor current flowing in the second armature winding 2*b* is negligibly small; then, the step S111 is followed by the step S103.

Figure 7A:
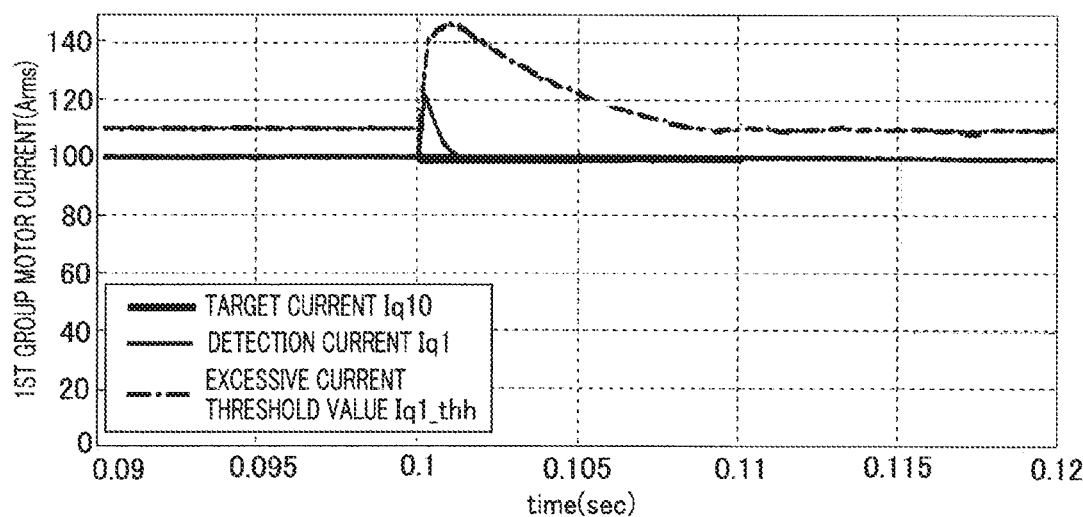
FIG. 7A is a timing chart for explaining the operation of the electric power steering apparatus according to Embodiment 1 of the present invention.
Figure 7B:
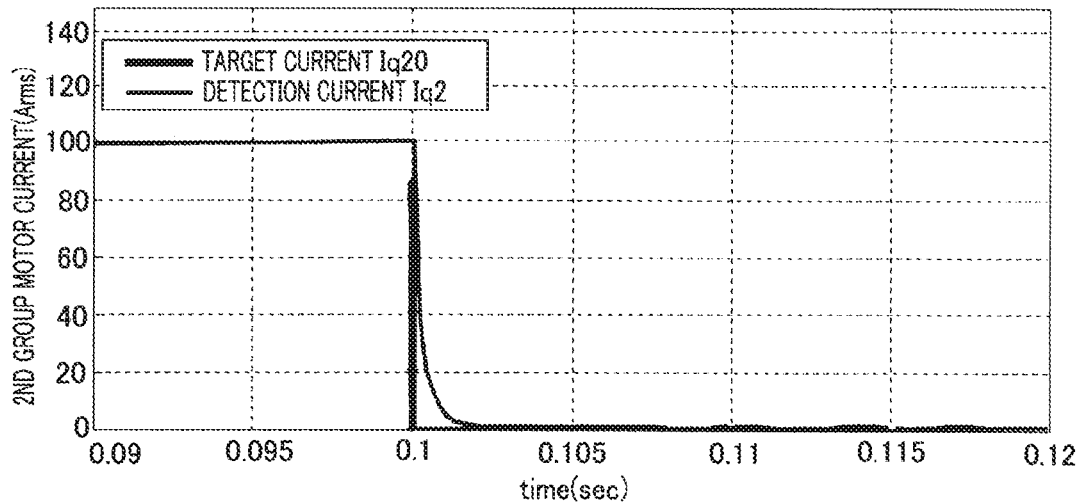
FIG. 7B is a timing chart for explaining the operation of the electric power steering apparatus according to Embodiment 1 of the present invention.

Each of FIGS. 7A and 7B represents a timing chart at a time when the excessive current determination threshold value is replaced by the value calculated based on the equation (2). That is to say, each of FIGS. 7A and 7B is a timing chart for explaining the operation of the electric power steering apparatus according to Embodiment 1 of the present invention; the ordinate in FIG. 7A denotes the target current Iq10 [Arms] in the first armature winding 2*a*, the detection current Iq1 [Arms], and the excessive current determination threshold value Iq1_thh [Arms] as an abnormality determination threshold value; the abscissa denotes the time [sec]. The ordinate in FIG. 7B denotes the target current Iq20 [Arms] in the second armature winding 2*b* and the detection current Iq2 [Arms]; the abscissa denotes the time [sec].

As represented in FIGS. 7A and 7B, even in the case where due to the first interference block 23*a*, the detection current Iq2 of the motor current flowing in the second armature winding 2*b* rapidly changes at a time point "0.1" and hence an effect is provided to the motor current in the first group, the detection current Iq1 of the motor current flowing in the first armature winding 2*a* does not exceed the threshold value for the excessive current determination current; thus, erroneous detection of a failure can be suppressed.

The foregoing equation (2) has been described, as an equation in a continuous system, by use of the Laplace operator s; however, because calculation utilizing a CPU is performed in a discrete system, it may be allowed that the equation (2) is transformed into an equation in the discrete system, by use of, for example, the bilinear transformation represented in the equation (3) below. T denotes the sampling time.

$$s = \frac{2}{T} \cdot \frac{1 - z^{-1}}{1 + z^{-1}} \qquad (3)$$

When the equation (3) is substituted for the equation (2), the equation (4) below is obtained; then, when the equation (4) is inverse z-transformed and rearranged with respect to Iq1_thh(n), the equation (5) below is obtained. The character n denotes the present value, and [n−1] denotes the immediately previous calculation value.

$$\text{Iq1\_thh}(z) = \qquad (4)$$
$$\frac{2Mq(1 - z^{-1})}{2Lq(1 + z^{-1}) + RT((1 + z^{-1})} \cdot \text{detection current } Iq2 + \text{Iq\_typ}$$

$$\text{Iq1\_thh}(n) = \frac{1}{2Lq + R \cdot T} \cdot \qquad (5)$$
$$\frac{2Mq \cdot (\text{detection current } Iq2(n) - \text{detection current } Iq2(n-1))}{(-2Lq + R \cdot T) \cdot \text{Iq\_thh}(n-1)} + \text{Iq\_typ}$$

Because the steps after and including the step S103 in FIG. 6 are the same as those in the flowchart explained with foregoing FIG. 4, the explanations therefor will be omitted.

As described above, even when the motor current flowing in one of the three-phase two sets of armature windings rapidly changes due to an abnormality in the circuit or the like, erroneous determination of an failure can be suppressed by changing the excessive current determination threshold value in the other one of the three-phase two sets of armature windings (normal winding); moreover, in the case where no effect from the other set exists, it is made possible to configure the apparatus without changing the existing excessive current determination threshold value.

Embodiment 2

Next, an electric power steering apparatus according to Embodiment 2 of the present invention will be explained. In Embodiment 2 of the present invention, the failure determination is performed in the following manner: in the case where it is difficult to calculate the excessive current determination threshold value based on the equation (2) or the equation (5) in foregoing Embodiment 1, in a period with which an excessive current can be determined, the fact that the differential component based on the Laplace operator s in the equation (2) is replaced by the detection current [Iq2(*n*)-Iq2(*n*−1)] in the equation (5) is utilized; in the case where the difference value is large, the excessive current determination threshold value is increased, and in the case where the difference value becomes small, the excessive current determination threshold value is restored to the original value.

Figure 8:
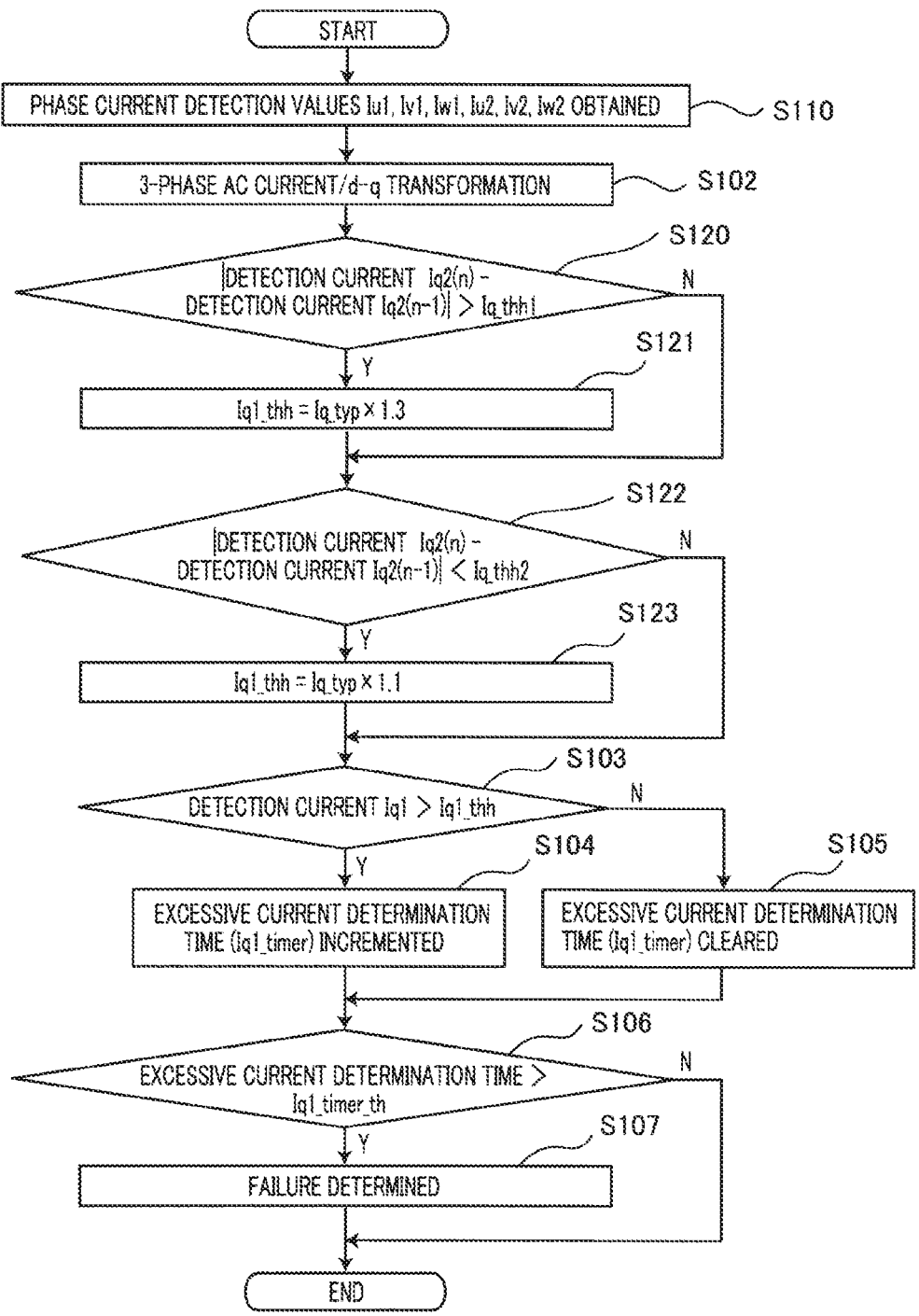
FIG. 8 is a flowchart for explaining the operation of an electric power steering apparatus according to Embodiment 2 of the present invention.

FIG. 8 is a flowchart for explaining the operation of the electric power steering apparatus according to Embodiment 2 of the present invention. The flowchart in FIG. 8 is different from the flowchart of Embodiment 1 represented in FIG. 6 only in terms of the determination logic for excessive current determination, and the overall circuit diagram in FIG. 1 of the foregoing Embodiment and the block diagram of the control unit in FIG. 5 thereof are the same as those in Embodiment 2; therefore, the explanations therefor will be omitted and the flowchart in FIG. 8 will mainly be explained.

In the flowchart represented in FIG. 8, the steps S120, S121, S122, and S123 replace the steps S111 and S112 in the flowchart represented in FIG. 6; because the other steps therein are substantially the same as those in the flowchart in FIG. 6, the explanations therefor will be omitted.

In the step S120 in FIG. 8, in the case where the effect of the mutual inductance is large in the first interference block 23a represented in FIG. 5 and hence the difference between the present value of the detection current of the motor current flowing in the second group, i.e., the second armature winding 2b, and the immediately previous value of the detection current in the second group is larger than a first excessive current difference switching determination threshold value Iq_thh1, the step S120 is followed by the step S121, where the excessive current determination threshold value Iq1_thh is increased, for example, to [Iq_typ×1.3] so that no erroneous determination is made; then, the step S121 is followed by the step S122.

In contrast, in the case where the difference between the detection-current present value and the detection-current immediately previous values of the second group is the same as or smaller than the first excessive current difference switching determination threshold value Iq_thh1, the excessive current determination threshold value is not changed, and the step S120 is followed by the step S122.

In the step S122, in the case where the difference between the present value of the 2nd group detection current and the immediately previous value of the 2nd group detection current is smaller than a second excessive current difference switching determination threshold value Iq_thh2, with which it can be determined whether or not the effect that is caused by the second group motor current and is provided through the mutual inductance is small, the step S122 is followed by the step S123, where as is the case with the foregoing technology as a basis of the present invention, the excessive current determination threshold value is set to, for example, [Iq_typ×1.1]; then, the step 123 is followed by the step S103.

In contrast, in the case where the difference between the present value of the 2nd group detection current and the immediately previous value of the 2nd group detection current is the same as or larger than the second excessive current difference switching determination threshold value Iq_thh2, the excessive current determination threshold value is not changed, and the step S122 is followed by the step S103.

Figure 9A:
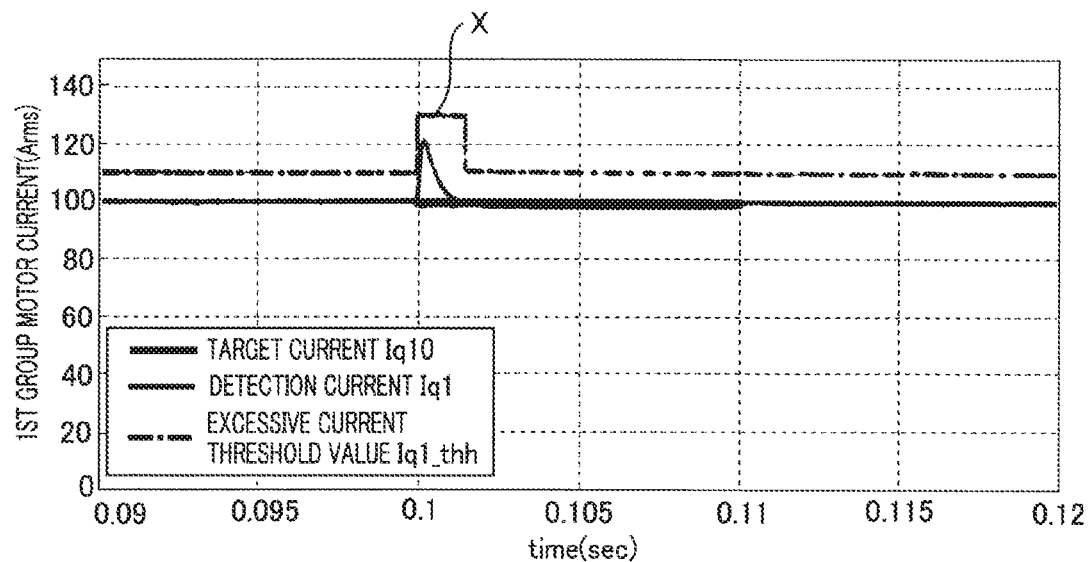
FIG. 9A is a timing chart for explaining the operation of the electric power steering apparatus according to Embodiment 2 of the present invention.
Figure 9B:
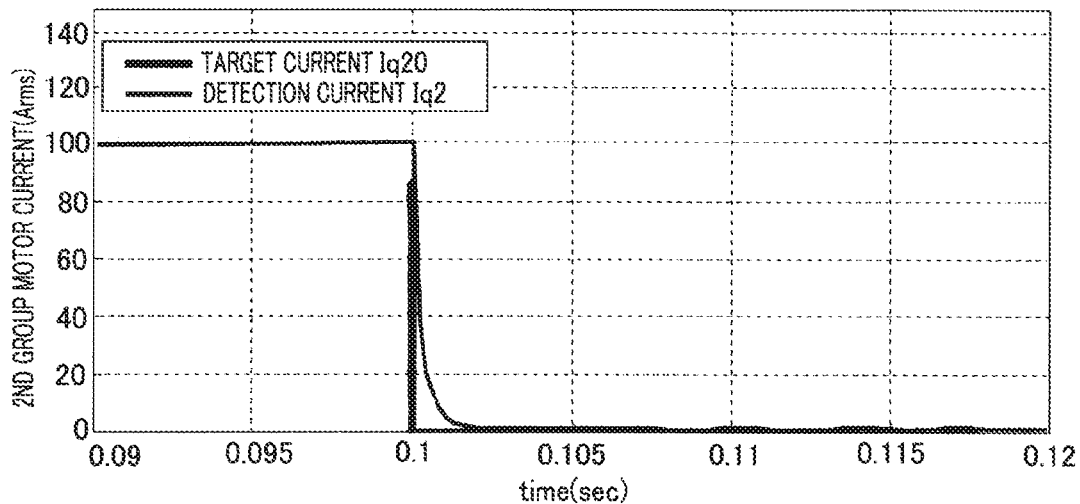
FIG. 9B is a timing chart for explaining the operation of the electric power steering apparatus according to Embodiment 2 of the present invention.

Each of FIGS. 9A and 9B represents a timing chart at a time when the foregoing determination is performed. That is to say, each of FIGS. 9A and 9B is a timing chart for explaining the operation of the electric power steering apparatus according to Embodiment 2 of the present invention; the ordinate in FIG. 9A denotes the target current Iq10 [Arms] in the first armature winding 2a, the detection current Iq1 [Arms], and the excessive current determination threshold value Iq1_thh [Arms] as an abnormality determination threshold value; the abscissa denotes the time [sec]. The ordinate in FIG. 9B denotes the target current Iq20 [Arms] in the second armature winding 2b and the detection current Iq2 [Arms]; the abscissa denotes the time [sec].

As represented in FIG. 9A, in the case where the difference between the present value and the immediately previous value of the second group motor current is large, the excessive current determination threshold value is increased as represented by "X" so that an abnormality in the normal group is prevented from being erroneously determined; in the case where the difference between the present value and the immediately previous value of the second group motor current is small, the excessive current determination threshold value is decreased so that excessive current determination can be performed in a manner the same as that in the technology as a basis of the present invention. Because the steps after and including the step S103 are the same as those in Embodiment 1, the explanation therefor will be omitted.

The effect, of a change in the motor current in the other group, that is provided through the first interference block 23a or the second interference block 23b represented in FIG. 5 is not calculated in such a complicated manner as expressed by the equation (2), but the failure determination threshold value is switched with a hysteresis by use of the immediately previous value and the present value of the motor current in the other group; as a result, there can be demonstrated an effect the same as that in Embodiment 1.

Embodiment 3

Next, an electric power steering apparatus according to Embodiment 3 of the present invention will be explained. In Embodiment 3, it can be prevented that in Embodiment 1, when in the case where the motor current in the second group oscillates, the excessive current determination time is switched, the excessive current determination threshold value becomes oscillatory when the motor current oscillates.

Figure 10:
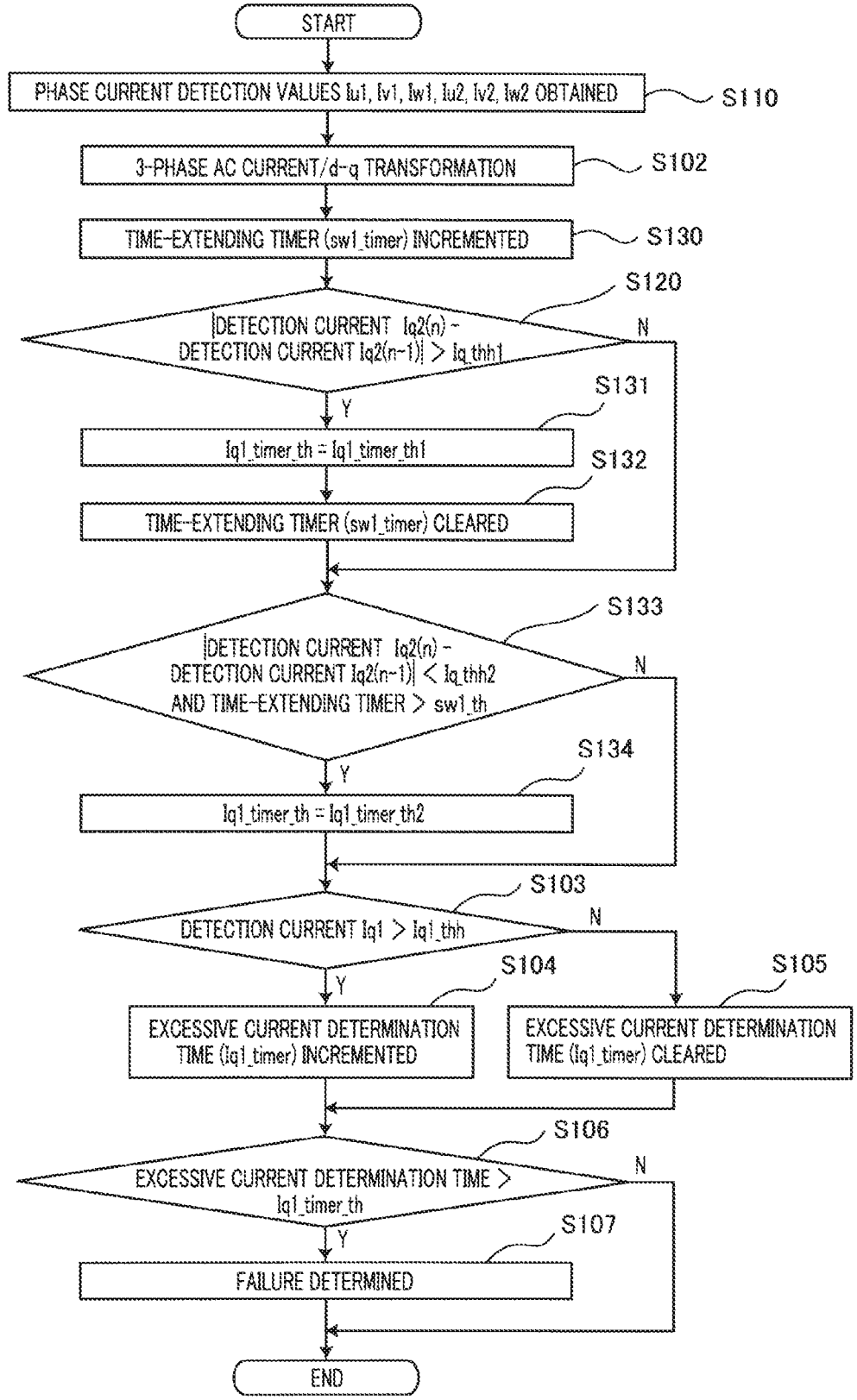
FIG. 10 is a flowchart for explaining the operation of an electric power steering apparatus according to Embodiment 3 of the present invention.

FIG. 10 is a flowchart for explaining the operation of an electric power steering apparatus according to Embodiment 3 of the present invention. In contrast to the flowchart in FIG. 6, the steps after and including the step S102 are changed in the flowchart in FIG. 10. The overall circuit diagram in FIG. 1 and the block diagram of the control unit in FIG. 5 in the foregoing embodiment are the same as those in Embodiment 3; therefore, the details thereof will be omitted, and only the flowchart represented in FIG. 10 will be explained.

In FIG. 10, the time-extending timer (sw1_timer) is incremented in the step S130. The time-extending timer is to prevent it for a predetermined time that a failure determination time is shortened, so that erroneous determination at a time when the failure determination time has been extended once is prevented. After the time-extending timer is incremented in the step S130, the steps S130 is followed by the step S120.

In the step S120, in the case where the difference between the present value of the 2nd group detection current and the immediately previous value of the 2nd group detection current is larger than the first excessive current difference switching determination threshold value Iq_thh1 and hence it can be determined that the effect that is provided through the mutual inductance in the first interference block 23a represented in FIG. 5 is large (Y), the step S120 is followed by the step S131, where the excessive current determination time is set with the time constant (Lq/R), calculated through the arithmetic expression represented in the equation (1), set to be, for example, thrice as long as a normal time constant, so that it is prevented that the time is so short that the determination is erroneously performed. The reason why the time constant (Lq/R), calculated through the arithmetic expression, is set to be thrice as long as the normal time constant is that in order to secure the stability, the time constant is set to a time with which erroneous determination is prevented; in general, the time constant may be set to a time in which the change in the sensor output reaches 95%.

After the excessive current determination time is set in the step S131, the time-extending timer sw1_timer is cleared in the step S132 so that after the excessive current determination threshold value has been once switched, the excessive current determination time is not shortened for a predetermined time; then, the step S132 is followed by the step S133.

In contrast, in the case where in the step S120, the difference between the present value of the 2nd group detection current and the immediately previous value of the 2nd group detection current is the same as or smaller than the first excessive current difference switching determination threshold value Iq_thh1, the excessive current determination time is not switched, and the step S120 is followed by the step S133.

In the step S133, in the case where the difference between the present value of the 2nd group detection current and the immediately previous value of the 2nd group detection current is smaller than the second excessive current difference switching determination threshold value Iq_thh2 and hence it can be determined that the effect that is provided through the mutual inductance in the first interference block 23a represented in FIG. 5 is small and in the case where after switching of the excessive current determination time, a predetermined time sw1_th has elapsed (Y), it is determined that the change in the second group motor current does not cause the excessive current abnormality determination on the first group to be erroneously performed; then, the step S1330 is followed by the step S134, where the excessive current determination time is switched to Iq1_timer_th2 so as to become as short as that in the technology, which is a basis of the present invention; then, the step S134 is followed by the step S103.

In contrast, in the case where in the step S133, the difference between the present value of the 2nd group detection current and the immediately previous value of the 2nd group detection current is the same as or larger than the second excessive current difference switching determination threshold value Iq_thh2 (N), the excessive current determination time is not switched, and the step S133 is followed by the step S103. Because the steps after and including the step S103 are the same as those in Embodiment 1, the explanation therefor will be omitted.

As described above, when the motor current in the other group changes, the excessive current abnormality determination time is changed, so that even when the motor current in the other group changes, an excessive current abnormality can be suppressed.

Embodiment 4

Next, an electric power steering apparatus according to Embodiment 4 of the present invention will be explained. In the electric power steering apparatus according to Embodiment 4 of the present invention, the control items of each of the first CPU 10a and the second CPU 10b change in accordance with a detected abnormality in the motor current. The control contents can roughly be classified into the following three kinds.

(1) The case where a control amount the same as that in the normal time is outputted;
(2) The case where some of the inverters are made inoperative and the control is continued with the other ones thereof and where the control amount is clearly different from that in the normal time; and
(3) The case where the whole control is stopped.

In the case (1), when for example, the same two sensors are provided as the first rotation sensor 17a and the second rotation sensor 17b in FIG. 1, the respective detection values of the two sensors are substantially equal to each other; therefore, even in the case where when one of the two sensors is abnormal, the other sensor is utilized, the respective control amounts at a normal time and an abnormal time are hardly different from each other, and hence there exists only an error as large as the device-level difference between the rotation sensors. When at an abnormal time, a control amount substantially the same as that at a normal time is outputted, it is not required to change the excessive current determination threshold value; therefore, the excessive current determination threshold value is not intentionally changed.

In the foregoing case (3), the control itself is stopped; therefore, even when there exists a difference in the control amount or even when an abnormality newly occurs, the apparatus does not need to coupe with these matters; thus, it is wasteful to change the threshold value in this case. However, in the foregoing case (2), because the control is continued and the control amount is different from that at a normal time, the handwheel steering power and the feeling are different even from those in the foregoing case (1); therefore, when the threshold value is the same, the determination may erroneously be performed. Provided that due to an erroneous determination, it is determined that an abnormality exists, it is suggested that double failures have occurred; thus, in some cases, there may occur the situation in which the control itself should be stopped. In contrast, when it is determined that no abnormality exists, the controllability is deteriorated, and hence an effect may be provided to the vehicle steering performance.

Accordingly, in the electric power steering apparatus according to Embodiment 4 of the present invention, especially as described in the foregoing case (2), the excessive current determination threshold value for detecting an abnormality while the control is continued can be changed in accordance with the control contents in a particular timing.

Next, a specific example of the electric power steering apparatus according to Embodiment 4 of the present invention will be explained. In the case where as the torque sensor included in the sensors 8 in FIG. 1, two sensors having the same function are provided and in the case where although when one of the torque sensors is abnormal, the control can be continued with the other one thereof, there exists only one important sensor, it becomes impossible to detect the output of the sensor when there occurs an adhesion abnormality in the output of the sensor. Accordingly, although calculating a control amount the same as that at a time when the sensor is normal, the first CPU 10a periodically adds a predetermined value to or subtracts a predetermined value from the calculated control amount and then outputs the modified calculated control amount. As a result, the effect of the value obtained through addition or subtraction is provided to the torque sensor and hence the torque value changed. This makes it possible to determine an abnormality in the sensor, which may be supposed to be normal.

As described above, when the control is continued while a control amount different from the control amount at a normal time is outputted, the variation width of the torque value corresponding to the value obtained through addition or subtraction is set in order to detect an adhesion abnormality in the torque sensor; in the case where a change larger than the threshold value occurs, it is determined that the sensor is normal; in contrast, in the case where even when addition/subtraction control is performed, no change in the torque value can be detected, it is determined that the sensor is abnormal. Two torque sensors are utilized in such a way that in contrast to a normal time, the variation width of the torque, an adhesion determination time, and the like for determining an adhesion abnormality are made variable.

As described above, in the case where when one sensor is abnormal, the control is continued and the control is different from the control at a normal time, the threshold value for an abnormality in the sensor can be changed in accordance with the control contents, so that erroneous determination is prevented.

As a similar specific example, as is the case where the first rotation sensor 17a and the second rotation sensor 17b are provided, it is made possible that two sensors having the same function are provided and that when one of the two sensors is abnormal, the other one thereof is utilized so that as is the case where no abnormality exists, the control is continued. Even in this case, in order to secure the correctness of an abnormality determination on a normal sensor, there can be performed the control in which the rotation angle is shifted by a predetermined angle from the rotation angle at a normal time. The control with such a shift makes it possible to make the torque value, for example, smaller than the target torque value at a normal time, i.e., to make the steering power lighter, and vice versa, conversely. Such control contents make it possible that not the abnormality threshold value for the rotation sensor but, for example, the threshold value for a current sensor is changed so that a threshold value corresponding to the "shifting" control is obtained and hence the correctness of the abnormality determination on the current sensor is raised.

As described above, in the case where when one of the two sensor is abnormal, the control is continued and the control is different from the control at a normal time, the abnormality threshold value for the other sensor can be changed in accordance with the control contents, so that erroneous determination on the other sensor is prevented. According to the foregoing two specific examples, even when unlike FIG. 1, all of both the first control unit 1a and the second control unit 1b are not provided, one control unit alone can perform the control.

Next, there will be explained a specific example in which the continuous control at an abnormal time is substantially the same as that at a normal time. In the case where although not represented in FIG. 1, a temperature sensor for detecting the temperature of the switching device, the armature winding of the electric motor 2, or the like is mounted, the temperature sensor is utilized for limiting the maximum current supply value for the electric motor 2 at a time when the temperature is high. There may be a case where because due to an abnormality in the temperature sensor, the current value cannot be limited, the temperature is estimated from the magnitude of the current, the supply time thereof, and the like and the maximum current supply value is set to a value smaller than the value at a time when the temperature sensor is utilized so that the safety is secured. In such a case, the difference between the respective control amounts at a normal time and at an abnormal time is substantially zero until the current limitation starts to function.

In other words, in the case where there exists a difference between the respective large current regions at a normal time and at an abnormal time, it is also made possible that at an abnormal time, the threshold value for current detection, for example, based on the voltage across the shunt resistor is made changeable. At a time when an abnormality occurs, the abnormality threshold value for the shunt resistor as a current sensor is set to be smaller than the value at a normal time, so that contribution is made not only to the abnormality determination but also to limitation of the temperature estimation; thus, eventually, there is demonstrated an effect that the overall functionality of the apparatus is prevented from being deteriorated.

Embodiment 5

Next, an electric power steering apparatus according to Embodiment 5 of the present invention will be explained. There will be considered an abnormality in which when in FIG. 1, part of components in any one of the first inverter circuit 3a, the second inverter circuit 3b, the first driving circuit 11a, and the second driving circuit 11b fail or the first-phase system or the second-phase system of the electric motor 2 fails, as disconnection of the first-phase winding of the electric motor 2, control cannot be performed as per the control command from the first CPU 10a or the second CPU 10b. In the case where an abnormality in a component of each of the circuits, such as a switching device, and an opening failure therein, disconnection of the shunt resistor, or the like occurs, the first CPU 10a or the second CPU 10b can detect this abnormality by monitoring the voltage at each of the portions. An initial check makes it possible that immediately after the engine is started, whether or not each of the components and each of connections is normal is preliminarily detected. In the case where when the CPU detects an abnormality, the contents of the abnormality is that there exists the abnormality only in one phase, the control can be continued with the remaining two phases and the three phases of the normal armature winding. It is also made possible that the control of the armature winding in which an abnormality exists is stopped and the control is continued with the normal armature winding alone.

Even in the case where through driving with five phases or fewer, it is tried to output a control amount the same as the control amount at a time when all of the circuits are normal and six-phase driving is performed, the control should be different from the six-phase driving. In such continuous control at an abnormal time, one phase or two phases are not driven, or only one phase is driven; thus, for example, the smoothness of electric-motor rotation is deteriorated and hence a torque ripple, a handwheel vibration, or a sound may occur. Although notified by the notification means 15 that an abnormality has occurred, the driver is made to actually feel by a vibration or a sound that the abnormality has occurred.

Each of the foregoing electric power steering apparatuses according to respective Embodiments of the present invention is the one in which at least any one of the following inventions described in the following items (1) through (6) is put into practice.

(1) An electric power steering apparatus comprising:

an electric motor that produces assist torque, based on steering torque produced by a driver of a vehicle; and a control unit that controls the electric motor, wherein the control unit includes
an input circuit to which information to be utilized to control the electric motor is inputted,
an inverter circuit that supplies an electric current to the electric motor,
a CPU that calculates a control amount for controlling the electric motor, based on the information inputted to the input circuit, and outputs a command signal based on the control amount, and
a driving circuit that drives the inverter circuit, based on the command signal outputted from the CPU, and
wherein the CPU has an abnormality control mode in which when detecting an abnormality in a portion related to control of the electric motor, the CPU calculates a control amount that is different at least from a control amount at a normal time, in accordance with the portion in which the abnormality has occurred and the contents of the abnormality, and then continues control of the electric motor; when control of the electric motor is continued in the abnormality control mode, a threshold value for detecting the abnormality is changed to a value different from a value at a normal time, in accordance with the contents of the control in the abnormality control mode.

(2) An electric power steering apparatus comprising:
an electric motor that produces assist torque, based on steering torque produced by a driver of a vehicle; and
a control unit that controls the electric motor,
wherein the electric motor is provided with two sets of armature windings including a first armature winding and a second armature winding that are formed in substantially the same manner,
wherein the control unit is formed of two sets of control units that are formed in substantially the same manner and that include a first control unit formed in such a way as to be capable of independently controlling the first armature winding and a second control unit formed in such a way as to be capable of independently controlling the second armature winding,
wherein each of the first control unit and the second control unit has
an input circuit to which information from a plurality of sensors is inputted,
a driving circuit that generates a driving signal for driving the electric motor,
an inverter circuit that is controlled by the driving signal, and
a control circuit unit provided with a CPU that outputs a command signal for controlling the electric motor to the driving circuit, based on the information inputted to the input circuit, and
wherein the CPU has an abnormality control mode in which when detecting an abnormality in part of the plurality of sensors, the CPU calculates a control amount that is different at least from a control amount at a normal time, in accordance with the sensor in which the abnormality has occurred and the contents of the abnormality, and then continues control of the electric motor; when control of the electric motor is continued in the abnormality control mode, a threshold value for detecting the abnormality is changed to a value different from a value at a normal time, in accordance with the contents of the control in the abnormality control mode.

(3) The electric power steering apparatus according to (2), wherein the CPU calculates the threshold value to which the value at a normal time is changed, based on a mutual inductance between the first armature winding and the second armature winding.

(4) The electric power steering apparatus according to any one of (1) through (3), wherein the threshold value has a hysteresis.

(5) The electric power steering apparatus according to any one of (1) through (4), wherein the CPU is configured in such a way as to be capable of changing an abnormality determination time for detecting the abnormality.

(6) The electric power steering apparatus according to (5), wherein the abnormality determination time has a hysteresis.

The present invention is not limited foregoing Embodiments; in the scope within the spirits of the present invention, the configurations of Embodiments can appropriately be combined with one another, can partially be modified, or can partially be omitted.

INDUSTRIAL APPLICABILITY

The present invention can be applied to the field of an electric power steering apparatus or a vehicle such as an automobile that is equipped with the electric power steering apparatus.

DESCRIPTION OF REFERENCE NUMERALS

1a: 1st control unit
1b: 2nd control unit
2: electric motor
3a: 1st inverter circuit
3b: 2nd inverter circuit
5a: 1st power-source relay
5b: 2nd power-source relay
8: sensors
10a: 1st CPU
10b: 2nd CPU
11a: 1st driving circuit
11b: 2nd driving circuit
12a: 1st input circuit
12b: 2nd input circuit
13a: 1st power source circuit
13b: 2nd power source circuit
14: communication line
15: notification means
17a: 1st rotation sensor
17b: 2nd rotation sensor

The invention claimed is:
1. An electric power steering apparatus comprising:
an electric motor that produces assist torque, based on a steering torque produced by a driver of a vehicle; and
a controller that controls the electric motor,
wherein the controller includes
an input circuit to which information to be utilized to control the electric motor is inputted,
an inverter circuit that supplies an electric current to the electric motor,
a CPU that calculates a control amount for controlling the electric motor, based on the information inputted to the input circuit, and outputs a command signal based on the control amount, and
a driving circuit that drives the inverter circuit, based on the command signal outputted from the CPU, and
wherein the CPU has an abnormality control mode in which, when detecting an abnormality in a portion related to control of the electric motor, the CPU calculates a control amount that is different at least from a control amount at a normal time, in accordance with the portion in which the abnormality has occurred and the contents of the abnormality, and then continues control of the electric motor; and when control of the electric motor is continued in the abnormality control mode, a threshold value for detecting the abnormality is changed to a value different from a value at a normal time, in accordance with the contents of the control in the abnormality control mode.

2. The electric power steering apparatus according to claim 1, wherein the threshold value has a hysteresis.

3. The electric power steering apparatus according to claim 2, wherein the CPU is configured in such a way as to be capable of changing an abnormality determination time for detecting the abnormality.

4. The electric power steering apparatus according to claim 3, wherein the abnormality determination time has a hysteresis.

5. The electric power steering apparatus according to claim 1, wherein the CPU is configured in such a way as to be capable of changing an abnormality determination time for detecting the abnormality.

6. The electric power steering apparatus according to claim 5, wherein the abnormality determination time has a hysteresis.

7. An electric power steering apparatus comprising:
an electric motor that produces assist torque, based on steering torque produced by a driver of a vehicle; and
a controller that controls the electric motor,
wherein the electric motor is provided with two sets of armature windings including a first armature winding and a second armature winding that are formed in substantially the same manner,
wherein the controller is formed of two sets of controllers that are formed in substantially the same manner and that include a first controller formed in such a way as to be capable of independently controlling the first armature winding and a second controller formed in such a way as to be capable of independently controlling the second armature winding,
wherein each of the first controller and the second controller has
an input circuit to which information from a plurality of sensors is inputted,
a driving circuit that generates a driving signal for driving the electric motor,
an inverter circuit that is controlled by the driving signal, and
a control circuit provided with a CPU that outputs a command signal for controlling the electric motor to the driving circuit, based on the information inputted to the input circuit, and
wherein the CPU has an abnormality control mode in which when detecting an abnormality in part of the plurality of sensors, the CPU calculates a control amount that is different at least from a control amount at a normal time, in accordance with the sensor in which the abnormality has occurred and the contents of the abnormality, and then continues control of the electric motor; and when control of the electric motor is continued in the abnormality control mode, a threshold value for detecting the abnormality is changed to a value different from a value at a normal time, in accordance with the contents of the control in the abnormality control mode.

8. The electric power steering apparatus according to claim 7, wherein the CPU calculates the threshold value to which the value at a normal time is changed, based on a mutual inductance between the first armature winding and the second armature winding.

9. The electric power steering apparatus according to claim 8, wherein the threshold value has a hysteresis.

10. The electric power steering apparatus according to claim 9, wherein the CPU is configured in such a way as to be capable of changing an abnormality determination time for detecting the abnormality.

11. The electric power steering apparatus according to claim 10, wherein the abnormality determination time has a hysteresis.

12. The electric power steering apparatus according to claim 8, wherein the CPU is configured in such a way as to be capable of changing an abnormality determination time for detecting the abnormality.

13. The electric power steering apparatus according to claim 12, wherein the abnormality determination time has a hysteresis.

14. The electric power steering apparatus according to claim 7, wherein the threshold value has a hysteresis.

15. The electric power steering apparatus according to claim 14, wherein the CPU is configured in such a way as to be capable of changing an abnormality determination time for detecting the abnormality.

16. The electric power steering apparatus according to claim 15, wherein the abnormality determination time has a hysteresis.

17. The electric power steering apparatus according to claim 7, wherein the CPU is configured in such a way as to be capable of changing an abnormality determination time for detecting the abnormality.

18. The electric power steering apparatus according to claim 17, wherein the abnormality determination time has a hysteresis.

* * * * *